United States Patent
Nemirovsky et al.

(10) Patent No.: US 11,836,633 B2
(45) Date of Patent: Dec. 5, 2023

(54) GENERATING REALISTIC COUNTERFACTUALS WITH RESIDUAL GENERATIVE ADVERSARIAL NETS

(71) Applicant: Vettery, Inc., New York, NY (US)

(72) Inventors: Daniel Alexander Nemirovsky, San Francisco, CA (US); Nicolas Kevin Thiebaut, San Francisco, CA (US)

(73) Assignee: Vettery, Inc., New York, NY (US)

( * ) Notice: Subject to any disclaimer, the term of this patent is extended or adjusted under 35 U.S.C. 154(b) by 42 days.

(21) Appl. No.: 17/469,339

(22) Filed: Sep. 8, 2021

(65) Prior Publication Data

US 2022/0083871 A1    Mar. 17, 2022

Related U.S. Application Data

(60) Provisional application No. 63/075,578, filed on Sep. 8, 2020.

(51) Int. Cl.
*G06N 3/08* (2023.01)
*G06N 3/088* (2023.01)
*G06N 3/045* (2023.01)

(52) U.S. Cl.
CPC ............. *G06N 3/088* (2013.01); *G06N 3/045* (2023.01)

(58) Field of Classification Search
CPC .............................. G06N 3/088; G06N 3/0454
See application file for complete search history.

(56) References Cited

U.S. PATENT DOCUMENTS

| | | | |
|---|---|---|---|
| 2018/0039946 A1* | 2/2018 | Bolte | G06Q 50/2057 |
| 2020/0226532 A1* | 7/2020 | Lazarus | G06Q 10/00 |
| 2020/0387836 A1* | 12/2020 | Nasr-Azadani | G06N 20/20 |
| 2021/0019572 A1* | 1/2021 | Munoz Delgado | G06N 7/005 |
| 2021/0073323 A1* | 3/2021 | Fisher | G06N 3/088 |
| 2021/0150330 A1* | 5/2021 | Sharma | G06N 3/08 |
| 2021/0350239 A1* | 11/2021 | Wang | G06N 20/10 |
| 2022/0108185 A1* | 4/2022 | Venugopalan | G06N 3/10 |

FOREIGN PATENT DOCUMENTS

WO    WO-2019108133 A1 *  6/2019    ......... G06Q 10/1053

OTHER PUBLICATIONS

Tavakolian et. al., "Learning to Detect Genuine versus Posed Pain from Facial Expressions using Residual Generative Adversarial Networks", May 2019 (Year: 2019).*

(Continued)

*Primary Examiner* — Selene A. Haedi
(74) *Attorney, Agent, or Firm* — Wolf, Greenfield & Sacks, P.C.

(57) ABSTRACT

Techniques for generating counterfactuals in connection with machine learning models. The techniques include applying a trained machine learning model to an input to obtain a first outcome; determining whether the first outcome has a value in a set of one or more target values; when it is determined that the first outcome does not have a value in the set of one or more target values, generating a counterfactual input at least in part by applying a trained neural network model to the input to obtain a corresponding output, the corresponding output indicating changes to be made to one or more values of one or more attributes of the input to obtain the counterfactual input, and generating feedback based on the counterfactual input.

20 Claims, 11 Drawing Sheets

(56) References Cited

OTHER PUBLICATIONS

Umer et al., "Deep Generative Adversarial Residual Convolutional Networks for Real-World Super-Resolution", May 2020 (Year: 2020).*
Moore et al., "Explaining Deep Learning Models with Constrained Adversarial Examples", 2019 (Year: 2019).*
Kaushik et al., "Learning the Difference that Makes a Difference with Counterfactually-Augmented Data", Feb. 2020 (Year: 2020).*
Scott-Clayton et al., "Should student employment be subsidized? Conditional counterfactuals and the outcomes of work-study participation.", 2016 (Year: 2016).*
International Search Report and Written Opinion dated Jan. 7, 2022 for International Application No. PCT/US2021/049416.
Cheng et al., DECE: Decision Explorer with Counterfactual Explanations for Machine Learning Models. arXiv preprint arXiv:2008.08353. Aug. 19, 2020. 10 pages.
Liu et al., Generative Counterfactual Introspection for Explainable Deep Learning. arXiv preprint arXiv:1907.03077. Jul. 6, 2019. 8 pages.
Nemirovsky et al., Providing Actionable Feedback in Hiring Marketplaces using Generative Adversarial Networks. Proceedings of the 14th ACM International Conference on Web Search and Data Mining Mar. 8, 2021; 1089-92.
Zhao, Fast real-time counterfactual explanations. arXiv preprint arXiv:2007.05684. Jul. 11, 2020. 6 pages.
International Preliminary Report on Patentability dated Mar. 23, 2023 for International Application No. PCT/US2021/049416.
PCT/US2021/049416, Mar. 23, 2023, International Preliminary Report on Patentability.

* cited by examiner

Candidate Profile 510

- 511a Name
  Contact Information
  Headline
- 511b Areas of Expertise and Skills
- 511c Experience and Roles
- 511d Educational Information
- 511e Expected Salary

FIG. 5A

Candidate Profile — 510

Name: John Smith  — 511a

Contact Information: Mailing Address, Email address, Telephone Number

Headline: Seasoned professional with over 14 years experience in sales and marketing

Areas of Expertise and Skills — 511b
- Adobe Creative Suite
- Social Media Marketing
- Google Analytics

Experience and Roles — 511c
- Marketing Manager; XYZ Company; June 2016 – Present
- Marketing Assistant; ABC Corporation; Sep. 2007 - May 2016

Educational Information — 511d
- B.S. in Business Administration at University of Calibri; June 2004-June 2007

Expected Salary: $160,000 — 511e

FIG. 5B

GENERATING REALISTIC COUNTERFACTUALS WITH RESIDUAL GENERATIVE ADVERSARIAL NETS

CROSS-REFERENCE TO RELATED APPLICATIONS

This application claims the benefit under 35 U.S.C. § 119(e) to U.S. Provisional Application Ser. No. 63/075,578, filed Sep. 8, 2020, entitled "GENERATING REALISTIC COUNTERFACTUALS WITH RESIDUAL GENERATIVE ADVERSARIAL NETS", which is incorporated by reference herein in its entirety.

BACKGROUND

Machine learning (ML) models have been widely applied in various industries such as healthcare, finance, recruiting, and criminal justice. This pervasiveness has resulted in growing demands for model interpretability and meaningful recourse. Providing meaningful recourse to users can help them achieve desired outcomes, for example, loan applicants can improve their chances of approval, patients can improve their diagnoses, and so on.

ML models map inputs to corresponding outputs. An ML model may map inputs to one or more outputs in a discrete (i.e., finite) set of outputs. Each of the outputs in the discrete set of outputs may be termed a "class", which is why ML models that map inputs to corresponding classes are sometimes termed classifiers. An ML model may map inputs to one or more outputs in a continuous (i.e., infinite) set of outputs (e.g., the set of real numbers). Such ML models may be termed "regression models."

SUMMARY

Some embodiments provide for a method comprising using at least one computer hardware processor to perform: applying a trained machine learning model to an input to obtain a first outcome; determining whether the first outcome has a value in a set of one or more target values; when it is determined that the first outcome does not have a value in the set of one or more target values, generating a counterfactual input at least in part by applying a trained neural network model to the input to obtain a corresponding output, the corresponding output indicating changes to be made to one or more values of one or more attributes of the input to obtain the counterfactual input, and generating feedback based on the counterfactual input.

According to one aspect, applying the trained machine learning model to the input produces a second outcome having a value in the set of one or more target values.

According to one aspect, the method comprises applying the trained machine learning model to the input to obtain the second outcome.

According to one aspect, the set of one or more target values is a discrete set of values and determining whether the first outcome has a value in the set of one or more target values comprises determining whether the first outcome has a value in the discrete set of values.

According to one aspect, the set of one or more target values comprises a single value and determining whether the first outcome has a value in the set of one or more target values comprises determining whether the first outcome has the single value.

According to one aspect, the set of one or more target values comprises a continuous set of values.

According to one aspect, the trained machine learning model comprises a trained machine learning classifier.

According to one aspect, the trained neural network model comprises a generator neural network model.

According to one aspect, the generator neural network model was trained using a discriminator neural network model trained to distinguish real input from synthetic input generated by the generator neural network model.

According to one aspect, the trained neural network model comprises a residual generative adversarial neural network (RGAN) model.

According to one aspect, the trained neural network model is a fully connected neural network.

According to one aspect, the plurality of attributes comprise a plurality of mutable attributes and at least one immutable attribute, and applying the trained neural network model to the input comprises applying the trained neural network model to the input to obtain a corresponding output indicating changes only to attribute values of at least some of the plurality of mutable attributes.

According to one aspect, generating the feedback based on the counterfactual input comprises generating a recommendation that a user consider making one or more of the changes indicated in the corresponding output of the trained neural network model.

According to one aspect, the method comprises generating an explanation indicating an impact of making the one or more of the changes indicated in the corresponding output of the trained neural network model.

According to one aspect, the trained machine learning model is associated with a hiring marketplace, the input comprises a candidate profile associated with a candidate, and generating the counterfactual input comprises generating a counterfactual candidate profile at least in part by applying the trained neural network model to the candidate profile and values of one or more attributes associated with the hiring marketplace to obtain the corresponding output.

According to one aspect, the trained machine learning model comprises a trained machine learning classifier configured to generate output used for ranking the candidate relative to one or more other candidates participating in the hiring marketplace.

According to one aspect, the trained machine learning model comprises a trained machine learning classifier configured to determine whether the candidate is permitted to join the hiring marketplace.

According to one aspect, generating the feedback based on the counterfactual input comprises generating a recommendation that the candidate consider making one or more of the changes indicated in the corresponding output of the trained neural network model.

Some embodiments provide for a system comprising: at least one processor; and at least one non-transitory computer readable storage medium storing instructions that when executed by the at least one processor, cause the at least one processor to perform a method comprising: applying a trained machine learning model to an input to obtain a first outcome; determining whether the first outcome has a value in a set of one or more target values; when it is determined that the first outcome does not have a value in the set of one or more target values, generating a counterfactual input at least in part by applying a trained neural network model to the input to obtain a corresponding output, the corresponding output indicating changes to be made to one or more values of one or more attributes of the input to obtain the counterfactual input, and generating feedback based on the counterfactual input.

Some embodiments provide for at least one non-transitory computer-readable storage medium storing processor executable instructions that when executed by at least one processor, cause the at least one processor to perform a method comprising: applying a trained machine learning model to an input to obtain a first outcome; determining whether the first outcome has a value in a set of one or more target values; when it is determined that the first outcome does not have a value in the set of one or more target values, generating a counterfactual input at least in part by applying a trained neural network model to the input to obtain a corresponding output, the corresponding output indicating changes to be made to one or more values of one or more attributes of the input to obtain the counterfactual input, and generating feedback based on the counterfactual input.

Some embodiments provide for a method, comprising using at least one computer hardware processor to perform: obtaining a candidate profile for a candidate, the candidate profile comprising attribute values for a plurality of attributes; applying a trained machine learning model associated with a hiring marketplace to the candidate profile to obtain a first outcome; determining whether the first outcome has a value in a set of one or more target values; when it is determined that the first outcome does not have a value in the set of one or more target values, generating a counterfactual candidate profile at least in part by applying a trained neural network model to the candidate profile to obtain a corresponding output, the corresponding output indicating changes to be made to one or more of the attribute values in the candidate profile to obtain the counterfactual candidate profile, and generating feedback for the candidate based on the counterfactual candidate profile.

According to one aspect, obtaining the candidate profile for the candidate comprises obtaining one or more attribute values for each attribute of the plurality of attributes via a web-based user interface.

According to one aspect, applying the trained machine learning model to the counterfactual candidate profile produces a second outcome having a value in the set of one or more target values.

According to one aspect, the method comprises applying the trained machine learning model to the counterfactual candidate profile to obtain the second outcome.

According to one aspect, applying the trained machine learning model to the candidate profile comprises generating a first input using the candidate profile; providing the first input as input to the trained machine learning model; and generating a first output from the trained machine learning model.

According to one aspect, the method comprises determining the first outcome from the first output.

According to one aspect, generating the counterfactual candidate profile comprises generating the counterfactual candidate profile at least in part by applying the trained neural network model to the first input and values of one or more attributes associated with the hiring marketplace to obtain the corresponding output.

According to one aspect, the trained machine learning model comprises a trained machine learning classifier configured to determine whether the candidate is permitted to join the hiring marketplace.

According to one aspect, the trained machine learning model comprises a trained machine learning classifier configured to generate output used for ranking the candidate relative to one or more other candidates participating in the hiring marketplace.

According to one aspect, the trained machine learning model comprises a gradient boosted decision trees model.

According to one aspect, the trained machine learning model comprises a neural network model.

According to one aspect, the neural network model comprises a fully connected neural network.

According to one aspect, the set of one or more target values is a discrete set of values, and wherein determining whether the first outcome has a value in the set of one or more target values comprises determining whether the first outcome has a value in the discrete set of values.

According to one aspect, the set of one or more target values comprises a single value, and wherein determining whether the first outcome has a value in the set of one or more target values comprises determining whether the first outcome has the single value.

According to one aspect, the set of one or more target values comprises a continuous set of values.

According to one aspect, the trained neural network model comprises a generator neural network model.

According to one aspect, the generator neural network model was trained using a discriminator neural network model trained to distinguish real candidate profiles from synthetic candidate profiles generated by the generator neural network model.

According to one aspect, the trained neural network model comprises a residual generative adversarial neural network (RGAN) model.

According to one aspect, the trained neural network model is a fully connected neural network.

According to one aspect, the trained neural network model comprises at least 50,000 parameters.

According to one aspect, the plurality of attributes comprise a plurality of mutable attributes and at least one immutable attribute, and applying the trained neural network model to the candidate profile comprises applying the trained neural network model to the candidate profile to obtain a corresponding output indicating changes only to attribute values of at least some of the plurality of mutable attributes.

According to one aspect, generating the feedback for the candidate comprises generating a recommendation that the candidate consider making one or more of the changes indicated in the corresponding output of the trained neural network model.

According to one aspect, the method comprises generating an explanation indicating an impact of making the one or more of the changes to the candidate profile.

Some embodiments provide for a system comprising: at least one processor; and at least one non-transitory computer readable storage medium storing instructions that when executed by the at least one processor, cause the at least one processor to perform a method comprising: obtaining a candidate profile for a candidate, the candidate profile comprising attribute values for a plurality of attributes; applying a trained machine learning model associated with a hiring marketplace to the candidate profile to obtain a first outcome; determining whether the first outcome has a value in a set of one or more target values; when it is determined that the first outcome does not have a value in the set of one or more target values, generating a counterfactual candidate profile at least in part by applying a trained neural network model to the candidate profile to obtain a corresponding output, the corresponding output indicating changes to be made to one or more of the attribute values in the candidate profile to obtain the counterfactual candidate profile, and generating feedback for the candidate based on the counterfactual candidate profile.

Some embodiments provide for at least one non-transitory computer-readable storage medium storing processor executable instructions that when executed by at least one processor, cause the at least one processor to perform a method comprising: obtaining a candidate profile for a candidate, the candidate profile comprising attribute values for a plurality of attributes; applying a trained machine learning model associated with a hiring marketplace to the candidate profile to obtain a first outcome; determining whether the first outcome has a value in a set of one or more target values; when it is determined that the first outcome does not have a value in the set of one or more target values, generating a counterfactual candidate profile at least in part by applying a trained neural network model to the candidate profile to obtain a corresponding output, the corresponding output indicating changes to be made to one or more of the attribute values in the candidate profile to obtain the counterfactual candidate profile, and generating feedback for the candidate based on the counterfactual candidate profile.

BRIEF DESCRIPTION OF THE DRAWINGS

Various aspects and embodiments of the disclosed technology will be described with reference to the following figures. It should be appreciated that the figures are not necessarily drawn to scale.

FIG. 5A is a diagram illustrating an example of a candidate profile that a candidate fills out when applying to join the hiring marketplace system, in accordance with some embodiments of the technology described herein.

FIG. 5B is a diagram illustrating a version of the candidate profile of FIG. 5A where attribute values have been provided for various attributes of the candidate profile, in accordance with some embodiments of the technology described herein.

DETAILED DESCRIPTION

Figure 1A:
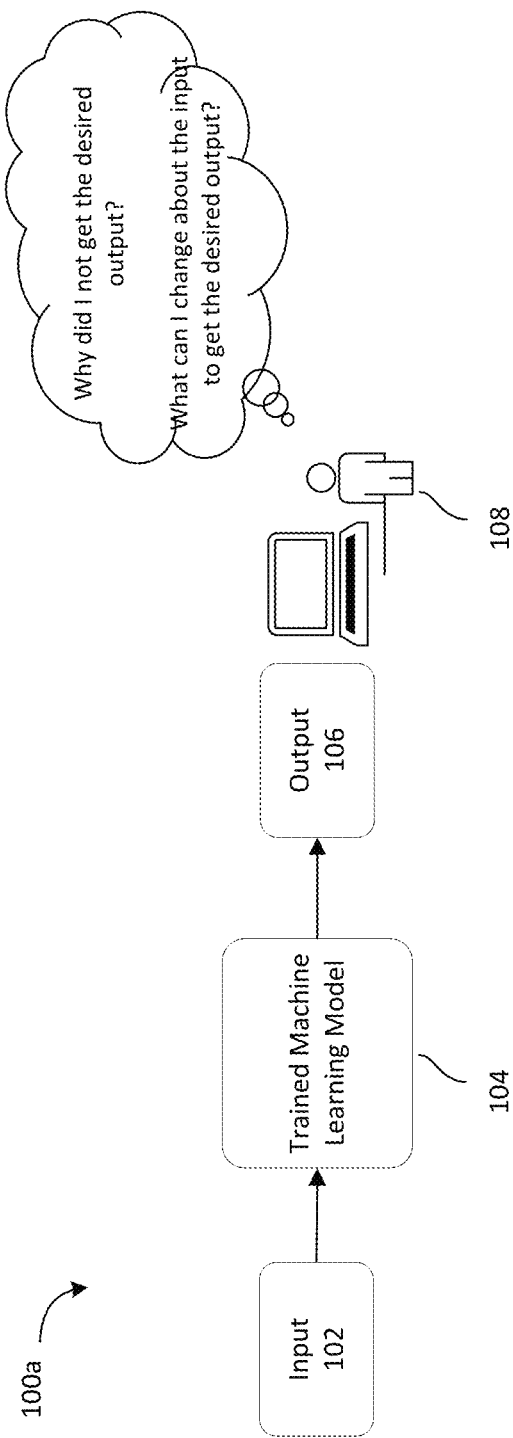
FIG. 1A is a diagram illustrating processing performed by a trained machine learning model on an input.

In many different applications, actions may be taken based on an output of a machine learning (ML) model. For example, a doctor may use an ML model to analyze a medical image of a patient. Based on the output of the ML model, the doctor may determine treatment for the patient. As another example, a user may be permitted to access protected database resources based on an output of an ML model that predicts whether the user is a legitimate user. As yet another example, a computer security company may allow or deny access to a user based on an output of an ML model that predicts whether a device utilized by the user to gain access is infected by malware.

The output of an ML model depends on the input provided to the ML model. Therefore, in cases where the ML model's output is not a desired output in that it does not result in a desired action being taken, a user may ask whether there is some way to change the input and change the output so that the action taken based on the changed output is a desired action. For example, based on an output of an ML model, a user may be provided with a negative medical diagnosis indicating that the user has diabetes. The user may ask what changes can be made to the input (e.g., his/her measurements relating body mass index, glucose, blood pressure, insulin, etc.) to improve his/her chances of receiving a positive medical diagnosis.

One approach to providing the user with feedback about changes that can be made to the input in order to change the output of an ML model in a particular way is to: (i) generate alternate inputs that are different from the original input, and (ii) determine whether providing the alternate inputs as inputs to the ML model changes its outputs and leads to a desired outcome rather than the original outcome that resulted from using the original input. Such alternate inputs, which include changes to original values of attributes of the original input may be referred to herein as "counterfactuals." For example, changes to a patient's original characteristics, such as, BMI index values, can be viewed as a "counterfactual" to the original characteristics. Various machine learning techniques have been developed for generating counterfactuals, however, these conventional techniques are inefficient and do not generate counterfactuals in real-time, which is important in some applications including those described herein.

For example, one conventional counterfactual generation technique includes applying an ML model to all possible alternate inputs by changing values of attributes of the input to understand how these values impact the output of the ML model. This approach is time-consuming and requires significant computational resources (e.g., processor resources, memory resources, etc.) because the ML model needs to process a large number of alternate inputs including various combinations of attributes. This is impractical (and impossible in situations where some variables can take on an infinite number of values, as the case may be for continuous-valued variables). This brute-force technique is unable to produce counterfactuals in real-time, thereby rendering it inadequate for real-time applications.

Another conventional technique for generating counterfactuals includes applying to the input an ML model (e.g., a neural network model) that allows for computation of gradients. In this approach, an iterative gradient-based search algorithm may be used to search through the space of alternate inputs rather than to do a brute-force search of all possible combinations of attributes. Although such an approach improves upon the brute-force technique, it is nevertheless computationally expensive as it takes time and computational resources to perform an iterative gradient-based search. As such, this approach is also unable to produce counterfactuals in real-time and hence is inadequate for real-time applications.

To address shortcomings of the conventional counterfactual generation techniques, the inventors have developed machine learning techniques that use trained generative models (e.g., models trained using generative adversarial network (GAN) architectures) to generate counterfactuals in real-time. The ML techniques developed by the inventors provide an improvement in counterfactual generation technology because they enable real-time generation of counterfactuals that achieve a desired output (and hence a desired action). The ML techniques developed by the inventors enable counterfactuals to be generated multiple orders of magnitude faster than conventional techniques, while utilizing significantly less computational resources than the conventional techniques. Using the ML techniques developed by the inventors, counterfactuals can be generated in real-time, for example, within a threshold amount of time (e.g., within one second, within 500 milliseconds, within 100 milliseconds, or within 50 milliseconds), which is important for certain applications (e.g., web-based applications).

In some embodiments, the ML techniques developed by the inventors involve utilizing a residual generative adversarial network (RGAN) model to generate counterfactuals. The RGAN model may include a generator neural network model and a discriminator neural network model. The discriminator neural network model may be trained to distinguish real data from synthetic data generated by the generator neural network model. The generator neural network model may be trained to process an original input to the generator neural network model and generate residuals that when added to the original input produce a counterfactual input (e.g., a synthetic data point for training the discriminator neural network model). Residuals may indicate changes to be made to values of attributes of the original input to obtain the counterfactual input. Once trained, the generator neural network model may be applied to generate counterfactuals specific to a fixed and previously trained machine learning model (e.g., machine learning classifier). The RGAN model may generate counterfactuals with low computational latency (e.g., less than a second) to ensure real-time applicability.

In some embodiments, the ML techniques developed by the inventors involve applying a trained machine learning model (e.g., machine learning classifier trained to determine whether a user is allowed access to a protected database resource) to an input (e.g., an input user profile including values of various attributes associated with the user's profile, such as, user id, role, etc.) to obtain a first outcome (e.g., yes or no, indicating whether the user is allowed or denied access). In some embodiments, the method may include determining whether the first outcome has a value in a set of one or more target values (e.g., whether the first outcome has a value "yes" when the set of target values is a single value). When it is determined that the first outcome does not have a value in the set of one or more target values (e.g., first outcome has the value "no"), the method may include generating a counterfactual input (e.g., a counterfactual user profile) at least in part by applying a trained neural network model (e.g., a trained generator neural network model) to the input to obtain a corresponding output (e.g., a residual), the corresponding output indicating changes to be made to one or more values of one or more attributes of the input to obtain the counterfactual input (e.g., changes to be made to values of attributes of the input user profile). The method may further include generating feedback based on the counterfactual input.

In some embodiments, applying the trained machine learning model to the input may produce a second outcome (e.g., the second outcome has the value "yes") having a value in the set of one or more target values. In some embodiments, the method may include applying the trained machine learning model to the input to obtain the second outcome.

In some embodiments, the set of one or more target values may be a discrete set of values and determining whether the first outcome has a value in the set of one or more target values may comprise determining whether the first outcome has a value in the discrete set of values. In some embodiments, the set of one or more target values may comprise a single value and determining whether the first outcome has a value in the set of one or more target values may comprise determining whether the first outcome has the single value. In some embodiments, the set of one or more target values may comprise a continuous set of values.

In some embodiments, the trained neural network model may comprise a generator neural network model.

In some embodiments, the generator neural network model was trained using a discriminator neural network model trained to distinguish real input from synthetic input generated by the generator neural network model.

In some embodiments, the trained neural network model may comprise a residual generative adversarial neural network (RGAN) model.

In some embodiments, the trained neural network model may be a fully connected neural network.

In some embodiments, the plurality of attributes may comprise a plurality of mutable attributes and at least one immutable attribute and applying the trained neural network model to the input may comprise applying the trained neural network model to the input to obtain a corresponding output indicating changes only to attribute values of at least some of the plurality of mutable attributes.

In some embodiments, generating the feedback based on the counterfactual input may comprise generating a recommendation that a user consider making one or more of the changes indicated in the corresponding output of the trained neural network model.

In some embodiments, the trained machine learning model may be associated with a hiring marketplace, the input may comprise a candidate profile associated with a candidate, and generating the counterfactual input may comprise generating a counterfactual candidate profile at least in part by applying the trained neural network model to the candidate profile and values of one or more attributes associated with the hiring marketplace to obtain the corresponding output.

In some embodiments, the trained machine learning model may comprise a trained machine learning classifier configured to generate output used for ranking the candidate relative to one or more other candidates participating in the hiring marketplace.

In some embodiments, the trained machine learning model may comprise a trained machine learning classifier configured to determine whether the candidate is permitted to join the hiring marketplace.

In some embodiments, generating the feedback based on the counterfactual input may comprise generating a recommendation that the candidate consider making one or more of the changes indicated in the corresponding output of the trained neural network model.

Following below are more detailed descriptions of various concepts related to, and embodiments of, methods and apparatus for generating counterfactuals. It should be appreciated that although the techniques described herein may be described in connection with generating counterfactuals in a variety of areas, one area of application is to use the technology described herein in connection with a hiring marketplace. It should be appreciated that various aspects described herein may be implemented in any of numerous ways. Examples of specific implementations are provided herein for illustrative purposes only. In addition, the various aspects described in the embodiments below may be used alone or in any combination and are not limited to the combinations explicitly described herein.

In some embodiments, the ML techniques developed by the inventors involve applying a trained machine learning model to a candidate profile to determine whether a candidate is permitted to join a hiring marketplace. The techniques described herein may be used to generate counterfactual candidate profiles (e.g., by applying a trained neural network model to the candidate profile) that can be used to generate feedback for the candidate indicating ways to improve his or her chances of being permitted to join the hiring marketplace. Once the candidate joins the hiring marketplace, the ML techniques described herein may be used to generate feedback for the candidate indicating ways to improve his or her ranking relative to one or more other candidates participating in the hiring marketplace.

FIG. 1A is a diagram 100a illustrating processing performed by a trained machine learning model on an input, in accordance with some embodiments of the technology described herein. As shown in FIG. 1A, trained machine learning model 104 may be configured to accept input 102 and provide an output 106. Input 102 may include attribute values for a number of attributes of the input. The trained machine learning model 104 may process the input 102 and provide as output 106 a prediction outcome. For example, input 102 may include values for attributes describing a patient's characteristics for the prediction of diabetes, such as, measurement values for glucose, blood pressure, insulin, BMI, skin thickness, and/or values for other attributes. In some embodiments, trained machine learning model 104 may be trained to predict whether a patient 108 has diabetes. A prediction outcome of "yes" indicating that the patient has diabetes may be considered a negative outcome whereas a prediction outcome of "no" indicating that the patient does not have diabetes may be considered a positive outcome. For instances where the trained machine learning model 104 provides a negative outcome, the patient may have questions about the negative outcome and want to understand what changes can be made to the input 102 to obtain a positive outcome. Conventional counterfactual generation techniques are inadequate at generating counterfactuals to the input that can be used to provide real-time feedback to the patient about the changes that can be made to the input to obtain a positive outcome.

Figure 1B:
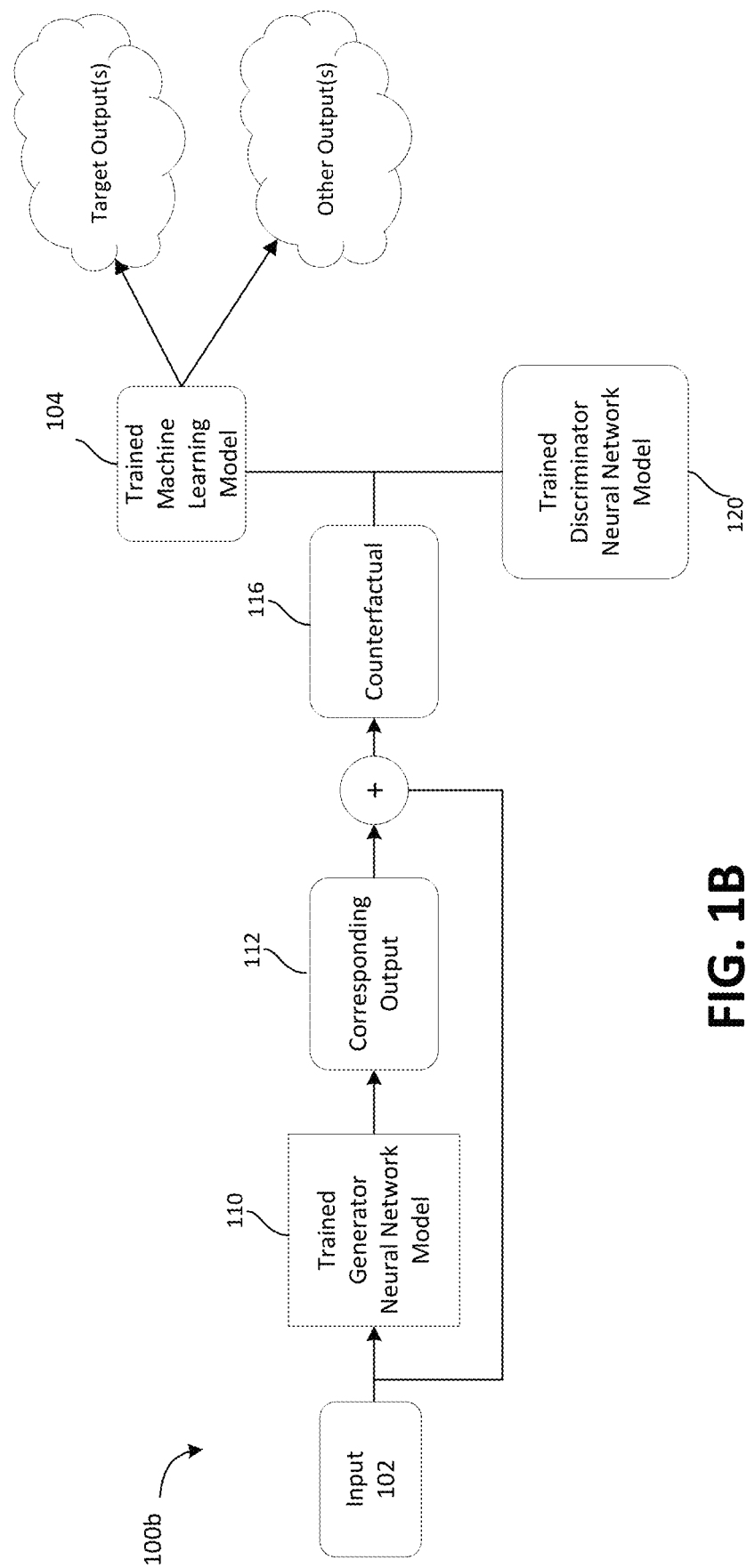
FIG. 1B is a diagram illustrating an architecture for generating a counterfactual by applying a trained neural network model to an input, in accordance with some embodiments of the technology described herein.

In some embodiments, the trained machine learning model 104 may be applied to the input 102 to obtain a first outcome (e.g., a first prediction outcome). A determination may be made regarding whether the first outcome has a value in a set of one or more target values. Continuing with the example above, the set of one or more target values may include a single value (e.g., "no") and a determination made be made regarding whether the first outcome has the value "no". When it is determined that the first outcome does not have a value in the set of one or more target values (e.g., first outcome has the value "yes"), the input 102 may be processed by a trained generator neural network model 110 as shown in FIG. 1B to generate a counterfactual 116 to the input 102 (also referred to herein as "counterfactual input"). Counterfactuals generated using the techniques described herein (e.g., in relation to FIGS. 1B, 2, 6B, and 7) can be used to provide real-time feedback to the user.

FIG. 1B is a diagram 100b illustrating an architecture for generating a counterfactual by applying a trained neural network model to an input, in accordance with some embodiments of the technology described herein. The architecture includes a residual generative adversarial network (RGAN) model to generate realistic and actionable counterfactuals. The RGAN model may include a trained generator neural network model 110 that is configured to generate residuals and a trained discriminator neural network model 120. As shown in FIG. 1B, the trained generator neural network model 110 may accept input 102 and process the input 102 to provide a corresponding output 112 (also referred to herein as "residuals"). The corresponding output 112 may indicate changes to be made to value(s) of attribute(s) of the input 102 to obtain counterfactual input 116. Continuing with the example above, the changes may include changes to be made to the value of the BMI attribute of the patient, such as a change to the BMI value from 26 to 24.5.

The counterfactual input 116 may be generated at least in part by applying the trained generator neural network model 110 to the input 102 to obtain the corresponding output 112. In some embodiments, the corresponding output 112 may be combined with the input 102 to obtain the counterfactual input 116. The trained machine learning model 104 may be applied to the counterfactual input 116 to generate a second outcome. When the second outcome has a value in the set of one or more target values (e.g., second outcome has the value "no"), a target or desired output indicating that the patient does not have diabetes is obtained.

In some embodiments, when the second outcome does not have a value in the set of one or more target values, the input 102 may be processed by the trained generator neural network model 110 in an iterative manner to generate additional corresponding outputs and counterfactuals until processing of a particular counterfactual by the trained machine learning model results in the target output being obtained. For example, a first counterfactual input may be generated during a first iteration by combining a first corresponding output with the input, where the first corresponding output indicates a first set of changes to be made to a first set of values of a first set of attributes of the input, a second counterfactual input may be generated during a second iteration by combining a second corresponding output with the input, where the second corresponding output indicates a second set of changes to be made to a second set of values of a second set of attributes of the input, and so on. In some embodiments, the first set of changes may be different than the second set of changes. In other embodiments, the first set of changes and the second set of changes may have at least one (but not all) change in common.

In some embodiments, the trained generator neural network model 110 may be trained using a discriminator neural network model 120 trained to distinguish real data from synthetic data generated by the generator neural network model 110. During training, the generator neural network model 110 and the discriminator neural network model 120 may be trained using an adversarial training approach. The generator neural network model 110 may be trained to generate synthetic data that confuses the discriminator neural network model 120. The discriminator neural network model 120 may be provided real data and the synthetic data generated by the generator neural network model 110 and may be trained to distinguish real data from the synthetic data.

The generator neural network model in the RGAN architecture may learn mappings to and from the same feature space X (i.e., from original input data points to their respective counterfactuals). This approach is different from a GAN model that draws its inputs from a random latent space Z. The contrast between the GAN and RGAN formulations can be seen by comparing their respective value functions, defined in equations (1) and (2):

$$v_{GAN}(G,D) = E_{x \sim p_{data}} \log D(x) + E_{z \sim p_z} \log(1 - D(G(z))) \quad (1)$$

$$v_{RGAN}(G,D) = E_{x \sim p_{target}} \log D(x) + E_{x \sim p_{input}} \log(1 - D(x + G(x))) \quad (2)$$

Where $\rho_{target} = P_{data}(\cdot|t)$ is the target class distribution and $P_{input}$ can be any probability distribution over the feature space. The objective of the discriminator neural network model (D) is to maximize the value function while the objective of the generator neural network model (G) is to minimize it. To ease convergence when the generator neural network model produces obvious unrealistic samples, the generator neural network model's minimization objective may be replaced with the maximization of $E_{x \sim p_{input}} \log D(x + G(x))$.

The RGAN model may be used to generate counterfactual inputs specific to a fixed and previously trained machine learning model 104. For example, the trained machine learning model 104 may be a trained machine learning classifier. The formulation of the value function for the RGAN model that relies on a trained generator neural network model G, a trained discriminator neural network model D, and a fixed classifier C (for a target class t) is defined in equation (3):

$$v_{counterRGAN}(G,D) = v_{RGAN}(G,D) + v_{CF}(G,C,t) \quad (3)$$

Equation (3) may be used when the trained machine learning classifier is known and differentiable. The second term $v_{CF}(G, C, t)$ drives the counterfactual toward the target class t.

$$v_{CF}(G,C,t) = E_{x \sim p_{input}} \log(1 - C_t(x + G(x))) \quad (4)$$

The inventors have recognized that there may be scenarios where the trained machine learning classifier is a non-differentiable model or its architecture is unknown (e.g., black box). For these scenarios, the inventors have developed a formulation of the value function for the RGAN model that takes the classifier's prediction into account by weighting the first term $v_{RGAN}$ (G, D). This formulation is defined in equation (5):

$$v_{CounterRGAN}(G, D) = \frac{\sum_i C_t(x_i) \log D(x_i)}{\sum_i C_t(x_i)} + \frac{1}{N} \sum_i \log(1 - D(x_i + G(x_i))) \quad (5)$$

Equation (5) applies the classifier's prediction outcome (e.g., a classifier prediction score) as a weight to a loss function. A maximum score that classifier C can predict is "1". Larger classifier scores indicate prediction outcomes that are closer to target outcomes. Input samples $x_i$ may be drawn from an entire dataset. The specific form of the value function defined in equation (5) is motivated by the convergence properties of the generator neural network model's output to maximize classifier prediction while retaining realism. Using either value function defined in equations (4) or (5), the discriminator neural network model learns to discriminate between real data (e.g., samples taken from real datasets) and synthetic data (e.g., data generated by the generator neural network model), while the generator neural network model aims to balance the realism and counterfactual constraints. As a result, the generator neural network model learns to generate residuals (i.e., corresponding output) that, when added to the input, generate realistic counterfactuals that are classified by C to be as close to "1" for the desired or target class as possible.

Figure 2:
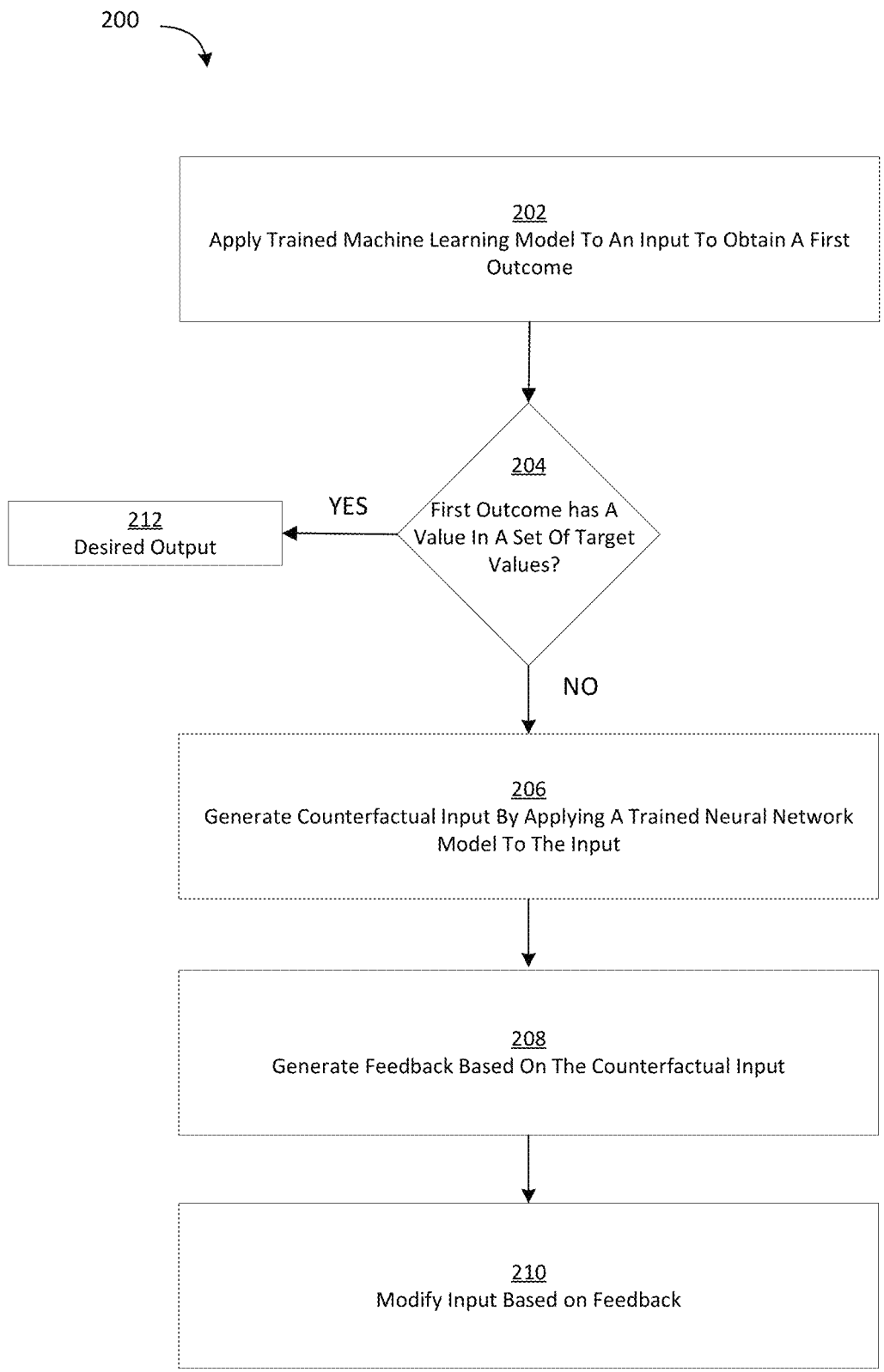
FIG. 2 is a diagram of a process of generating a counterfactual by applying a trained neural network model to an input, in accordance with some embodiments of the technology described herein.

FIG. 2 is a diagram of a process 200 of generating a counterfactual by applying a trained neural network model to an input, in accordance with some embodiments of the technology described herein. Process 200 may be executed by any suitable computing device. Process 200 begins at act 202, where a trained machine learning model (e.g., trained machine learning model 104) may be applied to an input (e.g., input 102) to obtain a first outcome. At act 204, a determination may be made regarding whether the first outcome has a value in a set of target values. When it is determined that the first outcome has a value in the set of target values, a determination made be made that a target or desired output has been obtained in act 212. When it is determined that the first outcome does not have a value in the set of target values, process 200 may proceed to act 206.

In act 206, a counterfactual input (e.g., counterfactual input 116) may be generated at least in part by applying a trained neural network model (e.g., trained generator neural network model 110) to the input to obtain a corresponding output (e.g., corresponding output 112). The corresponding output may indicate changes to be made to one or more values of one or more attributes of the input to obtain the counterfactual input. In some embodiments, the counterfactual input may be generated by combining the input and the corresponding output. In some embodiments, the counterfactual input may incorporate the changes indicated by the corresponding output.

In some embodiments, the trained machine learning model 104 may be applied to the counterfactual input to obtain a second outcome. When it is determined that the second outcome has a value in the set of target values, a determination may be made that making the changes indicated in the corresponding output will result in a target or desired output being obtained and the process 200 proceeds to acts 208 and 210. In some embodiments, when it is determined that the second outcome does not have a value in the set of target values, the process 200 may generate an additional counterfactual input by applying the trained neural network model to the input to obtain an additional corresponding output. The trained machine learning model may be applied to the additional counterfactual input to obtain a third outcome. When it is determined that the third outcome has a value in the set of target values, a determination may be made that making the changes indicated in the additional corresponding output will result in a target or desired output being obtained and the process 200 may proceed to acts 208 and 210. In some embodiments, when it is determined that the third outcome does not have a value in the set of target values, the process 200 may generate yet another counterfactual input by applying the trained neural network model to the input to obtain another corresponding output. This process may go on until a counterfactual input is generated that when processed by the trained machine learning model results in the target or desired output being obtained.

In act 208, feedback may be generated based on the counterfactual input. In some embodiments, generating the feedback may include generating a recommendation that a user consider making one or more of the changes indicated in the corresponding output of the trained neural network model. In some embodiments, generating the feedback may include generating an explanation indicating an impact of making the one or more of the changes indicated in the corresponding output. Continuing with the example above, a recommendation may be generated for the patient indicating that the patient consider making a change to the BMI value (e.g., from 26 to 24.5). Alternatively or additionally, an explanation may be provided indicating that reducing the BMI value may result in a target or desired output (e.g., a "no" diabetes prediction) to be obtained.

In act 210, the input may be modified based on the feedback. In some embodiments, one or more values of one or more attributes of the input may be modified based on the feedback. In some implementations, a recommendation may be presented to a user using a web-based user interface. The user may be prompted to accept or reject the recommendation. In response to the user accepting the recommendation, the input may be modified to incorporate the recommended change(s). For example, the BMI value of the input may be modified based on a recommendation that the patient consider making such a change.

In some embodiments, one or more rules may be defined and applied to generate counterfactuals that are realistic and actionable. Realism rules may indicate one or more attributes in the input that can only take on value(s) within a certain range such that generated counterfactuals resemble known distributions of real data. For example, a realism rule may indicate that the years of experience attribute of a candidate profile cannot have a negative value or can only include values ranging between 17-85. An actionability rule may indicate that values of no more than a threshold number of attributes may be changed during the counterfactual generation process. For example, an actionability rule may indicate that values of two attributes (e.g., expected salary and skills) may be changed during the counterfactual generation process. Another actionability rule may indicate that values of attributes may only be changed by a threshold amount during the counterfactual generation process. For example, an actionability rule may indicate that the expected salary may only be changed by ±$30,000. A counterfactual may be considered as actionable when it suggests reasonable and few changes.

The one or more rules may be implemented in any suitable way, for example, by a rules engine, as code, as a configuration file, and/or any suitable combination of the foregoing. In some embodiments, the one or more rules may be applied by the trained generator neural network model during the counterfactual generation process.

Figure 3:
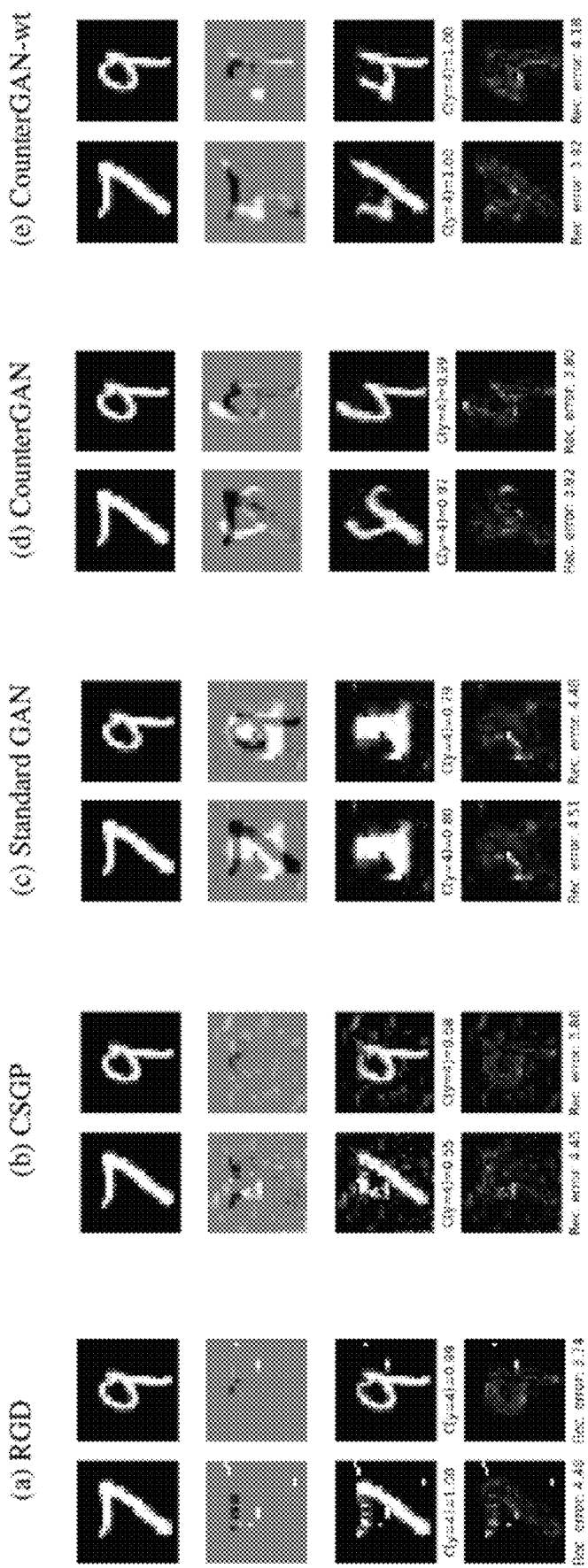
FIG. 3 shows a comparison of counterfactuals generated by applying different counterfactual generation techniques to a dataset including images of handwritten digits, in accordance with some embodiments of the technology described herein.

FIG. 3 shows a comparison of counterfactuals generated by applying different counterfactual generation techniques on a dataset including images of handwritten digits from MNIST, in accordance with some embodiments of the technology described herein. Column (a) represents the results of a first conventional counterfactual generation technique known as Regularized Gradient Descent (RGD). Column (b) represents the results a second conventional counterfactual generation technique known as Counterfactual Search Guided by Prototypes (CSGP). Column (c) represents results of applying a GAN model for generating counterfactuals. Column (d) represents results of applying a RGAN model for generating counterfactuals, wherein the RGAN model uses the value function defined in equation (3). Column (e) represents results of applying a RGAN model for generating counterfactuals, wherein the RGAN model uses the value function defined in equation (5).

Each technique is tasked with generating counterfactuals to achieve a desired or target class "4", as predicted by the classifier. Counterfactuals generated by each technique for two digits "7" and "9" are shown in FIG. 3. The first row in FIG. 3 for each technique shows the original input data point and the third row shows the generated counterfactuals. As can be seen in FIG. 3, techniques (d) and (e) utilizing the RGAN model result in the most realistic, visually convincing, and actionable counterfactuals (as corroborated by large classifier scores of 0.97 to 1) while still being diverse. The metrics utilized for measuring the relative performance of each of these techniques are shown in Table 1 below:

Examples of Metrics Utilized for Measuring
Relative Performance of Various Counterfactual
Generation Techniques

TABLE 1

| Metric | Formula |
| --- | --- |
| Counterfactual prediction gain | $\mathbb{E}[C(x_i^{cf}) - C(x_i)]$ |
| Realism | $\mathbb{E}[\|AE(x_i^{cf}) - (x_i^{cf}\|_2^2]$ |
| Actionability (Sparaity & proximity) | $\mathbb{E}[\|x_i^{cf} - x_i\|_1]$ |
| Latency | $\mathbb{E}[\delta t_i]$ |

Where C and $x_i$ denote the classifier and the original data point for which a counterfactual ($x_i^{cf}$) is sought. A denoising convolutional autoencoder whose reconstruction error serves as a proxy for realism is denoted as AE.

Prediction gain refers to the difference between the classifier's prediction on the counterfactual (C ($x_i^{cf}$)) and the input data point (C ($x_i$)). Since the maximum score classifier C can predict is "1", the range for prediction gain is [1,0] with higher gain indicating more improvement.

Actionability (sparsity, proximity) refers to a measure of the number and magnitude of changes present in the counterfactual ($x_i^{cf}$) relative to the input data point ($x_i$) using the L1 norm distance. A lower value corresponds to less changes and hence a higher degree of actionable feedback.

Realism refers to a measure of how well a counterfactual "fits in" with the known data distribution. A denoising convolutional autoencoder AE (·) is trained on a training dataset. The L2 norm with the reconstruction error is used as a measure of realism. A lower value represents higher realism.

Latency refers to the computational latency needed to generate a single counterfactual. A lower latency represents faster counterfactual generation. Subsecond results indicate applicability for real-time applications.

Table 2 below illustrates the performance results for each of the techniques depicted in FIG. 3. For each metric, the arrow indicates whether larger T or lower values L are better and the best model is indicated in bold. The realism metric ranges from 3.89 (average reconstruction error of the autoencoder on a test dataset) to 11.99 (reconstruction error of noise uniformly sampled from [0,1]).

Examples of Performance Results for Various
Counterfactual Generation Techniques

TABLE 2

|  | RGD | CSGP | GAN | CounteRGAN | CounteRGAN-wt |
|---|---|---|---|---|---|
| ↑Prediction gain | 0.83 ± 0.01 | 0.43 ± 0.00 | 0.69 ± 0.01 | 0.80 ± 0.01 | 0.85 ± 0.01 |
| ↓Realism | 4.56 ± 0.01 | 4.58 ± 0.01 | 4.50 ± 0.00 | 3.95 ± 0.01 | 4.37 ± 0.01 |
| ↓Sparsity | 20.63 ± 0.41 | 54.24 ± 0.60 | 151.98 ± 0.43 | 79.47 ± 0.47 | 72.99 ± 0.52 |
| ↓Latency (ms) | 4,129.57 ± 3.33 | 5,359.58 ± 2.72 | 13.05 ± 0.04 | 13.33 ± 0.04 | 13.52 ± 0.04 |

Figure 4:
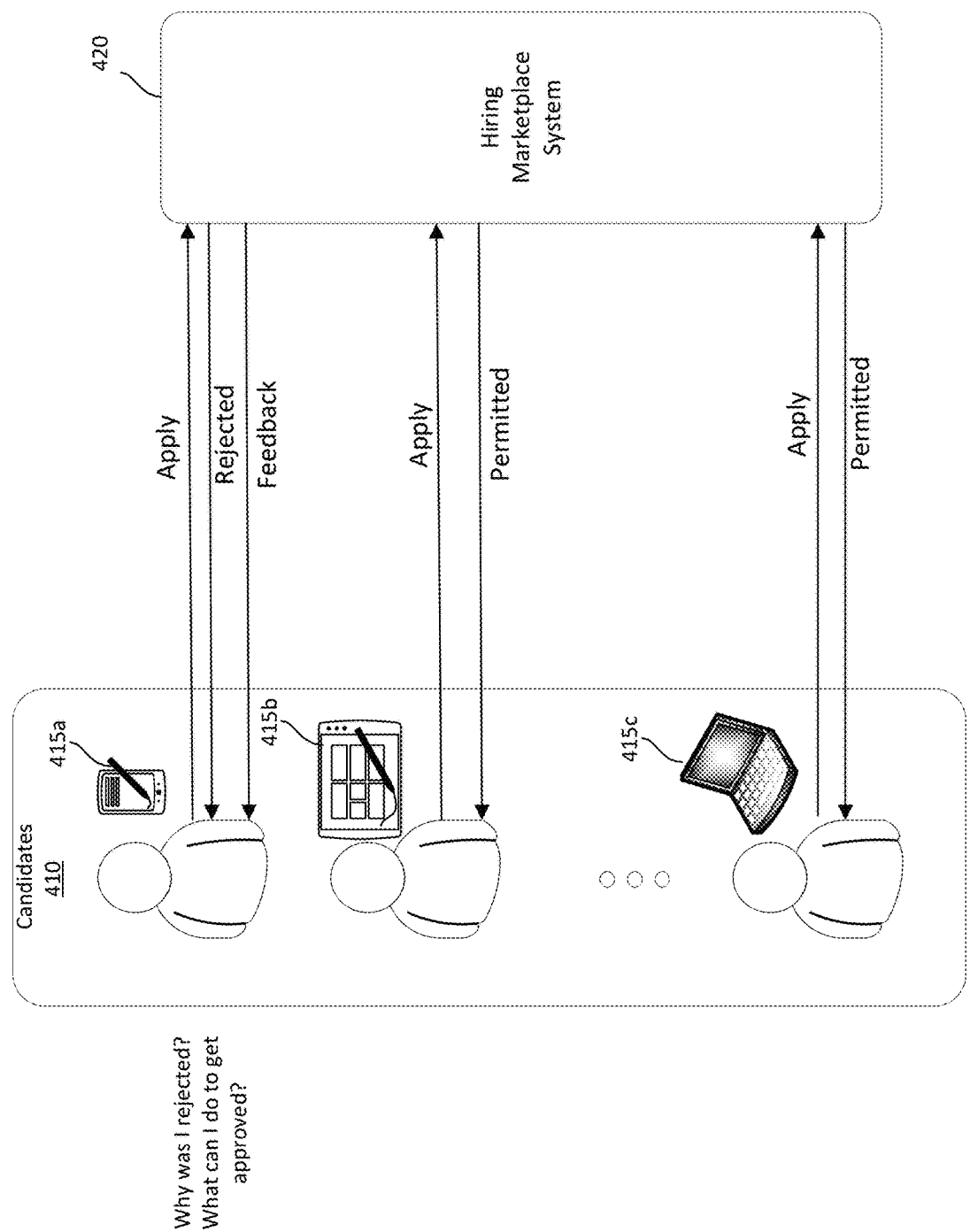
FIG. 4 is a diagram illustrating examples of candidates applying to join a hiring marketplace system, in accordance with some embodiments of the technology described herein.

Example Use Case—Utilizing RGAN Model to Generate Counterfactuals for Providing Actionable Feedback to Candidates Applying to Join a Hiring Marketplace FIG. 4 is a diagram illustrating candidates applying to join a hiring marketplace system, in accordance with some embodiments of the technology described herein. Various candidates (collectively referred to as "410") may apply to join a hiring marketplace system 420. Candidates may interact with the hiring marketplace system 420 via respective computing devices 415a, 415b, 415c. Although three candidates are shown in FIG. 4, one or any suitable number of candidates may interact with the hiring marketplace system 420, as aspects of the disclosure provided herein are not limited in this respect.

Each of computing devices 415a-c may be any suitable type of electronic device which a candidate may use to interact with the hiring marketplace system 420. In some embodiments, one or more of computing devices 415a-c may be a portable device such as a mobile smart phone, a personal digital assistance (PDA), a laptop computer, a tablet computer, or any other portable device that may be used to interact with the hiring marketplace system 420. In some embodiments, one or more of computing devices 415a-c may be a fixed electronic device such as a desktop computer, a rack-mounted computer, or any other suitable fixed electronic device that may be used to interact with the hiring marketplace system 420. In some embodiments, computing devices 415a-c may communicate with the hiring marketplace system 420 via a network (such as a local area network, a wide area network, a corporate intranet, the Internet, and/or any other suitable network) using wired, wireless, and/or any other suitable type of connections, as aspects of the disclosure provided herein are not limited in this respect.

In some embodiments, a candidate may interact with the hiring marketplace system 420 via any suitable application program configured to execute on the candidate's computing device (e.g., computing device 415a, 415b, and 415c). For example, the candidate may interact with the hiring marketplace system 420 by using a web-browser application program. As another example, the candidate may interact with the hiring marketplace system 420 by using a standalone application program dedicated to providing access to the hiring marketplace system 420.

In some embodiments, a candidate may interact with the hiring marketplace system by providing the hiring marketplace system with information about him/her. For example, the candidate may provide information to the hiring marketplace system by filling out a candidate profile, such as candidate profile 510 depicted in FIG. 5A. In some embodiments, the information provided to the hiring marketplace system may include the candidate's personal information (e.g., the candidate's name, address, email address, telephone numbers, information identifying the candidate's references, information identifying the candidate's experience, areas of expertise, and educational information, headline information, etc.). In some embodiments, the information provided to the hiring marketplace may include information indicating one or more jobs of interest to the candidate (e.g., by specifying one or more employers, identifying one or more jobs, specifying one or more industries, specifying one or more salary ranges, etc.).

In some embodiments, the candidate may initially interact with the hiring marketplace system 420 to apply to join the hiring marketplace system 420. Once permitted to join, the candidate may interact with the hiring marketplace system 420 to apply for one or more jobs, seek one or more job interviews, and/or perform other tasks on the hiring marketplace system 420. The candidate may provide the hiring marketplace system 420 with any information needed for these tasks, as aspects of the disclosure are not limited in this respect.

FIG. 5A is a diagram illustrating an example of a candidate profile 510 that a candidate may fill out when applying to join the hiring marketplace system 420, in accordance with some embodiments of the technology described herein. The candidate profile may include various attributes 511a-e for which a candidate may provide information. FIG. 5B illustrates a version of the candidate profile 510 where the candidate has provided values for attributes 511a-e. In some embodiments, the candidate may provide the hiring marketplace system 420 with the information (i.e., attribute values) via an application program (e.g., web-browser application program, standalone application program, etc.) executing on the candidate's computing device. The candidate may provide this information using any suitable user interface (e.g., by filling out one or more forms, uploading one or more files, checking one or more checkboxes, etc.), or in any other suitable way, as aspects of the disclosure provided herein are not limited by the manner in which a candidate provides information to the hiring marketplace system 420.

In some embodiments, the hiring marketplace system 420 may provide information to a candidate. For example, the hiring marketplace system 420 may provide the candidate with an indication of whether he or she is permitted to join the hiring marketplace system 420. As shown in FIG. 4, hiring marketplace system 420 may provide an indication to some candidates that they have been permitted to join the hiring marketplace system 420 and some other candidates that they have been rejected or are not permitted to join the hiring marketplace system 420. In this case, the hiring marketplace system 420, using the techniques described herein, may provide a candidate who is rejected with feedback regarding changes the candidate should consider making to the candidate profile to increase his or her chances of being permitted to join the hiring marketplace.

As another example, the hiring marketplace system 420 may provide the candidate with an indication of his or her rank relative to one or more other candidates participating in the hiring marketplace system 420. In this case, the hiring marketplace system 420, using the techniques described herein, may provide the candidate with feedback regarding changes the candidate should consider making to the candidate profile to increase his or her ranking relative to other candidates. A higher rank may increase the chances of a recruiter picking the candidate's profile (over other candidates' profiles) for a job or interview.

In some embodiments, the hiring marketplace system 420 may comprise one or more computing devices (e.g., servers, rack-mounted computer(s), desktop computer(s), etc.) each comprising one or more processors. The one or more computing devices forming the hiring marketplace system 420 may be local, distributed (e.g., cloud), and may be connected via any suitable means. Hiring marketplace system 420 may comprise one or more non-transitory computer readable storage media (e.g., memory and/or one or more other non-volatile storage media) configured to store processor-executable instructions, that when executed by one or more processors of hiring marketplace system 420, cause the hiring marketplace system 420 to perform any of numerous functions described herein in relation to FIGS. 4-7.

In some embodiments, the hiring marketplace system 420 may be communicably coupled to a database (not shown) that stores one or more rules that can be applied during the counterfactual generation process. The one or more rules may include realism rules, actionability rules, and/or other rules. Realism rules may indicate one or more attributes in the input that can only take on value(s) within a certain range such that generated counterfactuals resemble known distributions of real data. For example, a realism rule may indicate that the years of experience attribute of a candidate profile cannot have a negative value or can only include values ranging between 17-85. An actionability rule may indicate that values of no more than a threshold number of attributes may be changed during the counterfactual generation process. For example, an actionability rule may indicate that values of two attributes (e.g., expected salary and skills) may be changed during the counterfactual generation process. Another actionability rule may indicate that values of attributes may only be changed by a threshold amount during the counterfactual generation process. For example, an actionability rule may indicate that the expected salary may only be changed by ±$30,000.

Figure 6A:
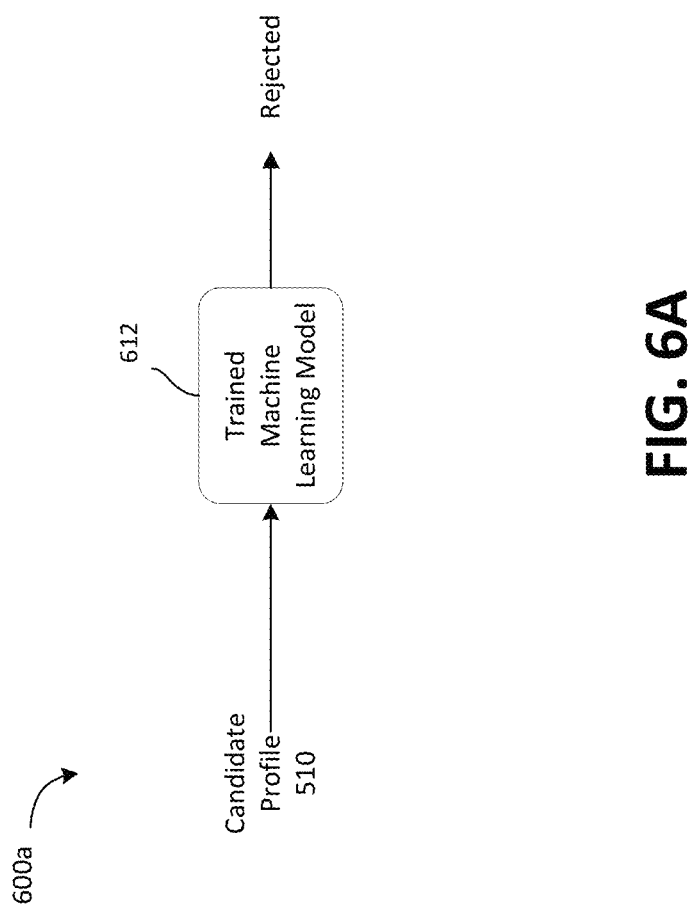
FIG. 6A is a diagram illustrating processing performed by a trained machine learning model on an input candidate profile, in accordance with some embodiments of the technology described herein.

FIG. 6A is a diagram 600a illustrating processing performed by a trained machine learning model associated with a hiring marketplace system, such as hiring marketplace system 420, in accordance with some embodiments of the technology described herein. The trained machine learning model may be implemented by the hiring marketplace system 420 for candidate curation. As shown in FIG. 6A, a trained machine learning model 612 may be configured to accept as input a candidate profile, such as candidate profile 510. Trained machine learning model 612 may be a trained machine learning classifier that is trained to predict whether the candidate is permitted to join the hiring marketplace system 420. Trained machine learning model 612 may process the input candidate profile 510 and provide as output a prediction outcome indicating whether the candidate is permitted to join the hiring marketplace system 420. Processing the input candidate profile 510 may include processing attribute values for a number of attributes of the candidate profile. FIG. 6A shows a prediction outcome "rejected" indicating that the candidate is not permitted to join the hiring marketplace system 420. For a rejected candidate, the hiring marketplace system 420 may, using the RGAN model described in FIG. 6B, generate real-time feedback for the candidate to increase his or her chances of being permitted to join the hiring marketplace system 420.

In some embodiments, the trained machine learning model 612 may be applied to the input candidate profile 510 to obtain a first outcome (e.g., a first prediction outcome). In some embodiments, applying the trained machine learning model 612 to the input candidate profile 510 may include generating a first input using the candidate profile, providing the first input as input to the trained machine learning model, and generating a first output from the trained machine learning model. In some embodiments, the trained machine learning model 612 may include a trained machine learning classifier configured to determine whether the candidate is permitted to join the hiring marketplace system 420.

In some embodiments, a determination may be made regarding whether the first outcome has a value in a set of one or more target values. In some embodiments, the set of one or more target values may include a single value (e.g., "1" for permitted to join the hiring marketplace system 420) and a determination made be made regarding whether the first outcome has the value "1".

Figure 6B:
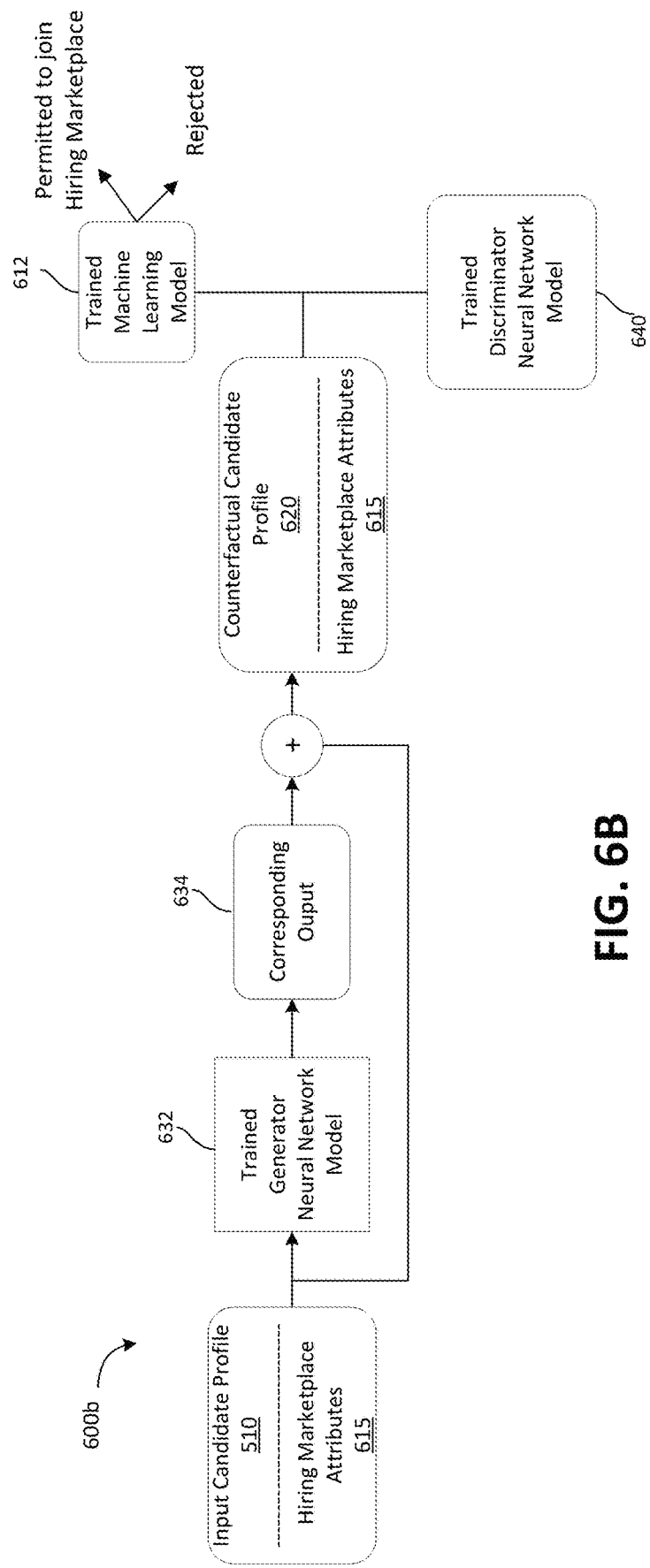
FIG. 6B is a diagram illustrating an architecture for generating a counterfactual candidate profile by applying a trained neural network model to an input candidate profile, in accordance with some embodiments of the technology described herein.

When it is determined that the first outcome does not have a value in the set of one or more target values (e.g., first outcome has the value "0" for rejected), the candidate profile 510 may be processed by a trained generator neural network model 632 as shown in FIG. 6B to generate a counterfactual 620 to the candidate profile 510 (also referred to herein as "counterfactual candidate profile"). The counterfactual candidate profile 620 may be used to provide the real-time actionable feedback to the candidate. The actionable feedback may indicate how the candidate can modify his or her profile to improve the classifier score and hence, his or her chances of being permitted to join the marketplace. In some embodiments, the actionable feedback may amount to differences or modifications contained in the counterfactual candidate profile 620 relative to the original candidate profile 510. In addition, the counterfactual candidate profile may be useful for improving model interpretability, for instance, by highlighting potential biases and irregular predictions of the machine learning classifier (e.g., does the classifier's score change if a candidate's gender or race is modified?).

The inventors have recognized that for real-time actionable feedback, the counterfactual candidate profile needs to be realistic (e.g., no negative years of experience), require reasonable and few changes (e.g., be sparse), achieve the desired or target outcome (e.g., by improving the classifier score), and be generated within real-time latency constraints. The techniques described herein in relation to FIGS. 6B and 7 can be used to generate counterfactual candidate profiles with these attributes and hence can be used to provide real-time actionable feedback to candidates.

FIG. 6B is a diagram 600b illustrating an architecture for generating a counterfactual candidate profile by applying a trained neural network model to an input candidate profile, in accordance with some embodiments of the technology described herein. The architecture utilizes a residual generative adversarial network (RGAN) model to generate realistic, actionable, and real-time counterfactual candidate profiles. The RGAN model may include a trained generator neural network model 632 that is configured to generate profile residuals and a trained discriminator neural network model 640. As shown in FIG. 6B, the trained generator neural network model 632 may accept the candidate profile 510 as input and may process the input candidate profile 510 to provide a corresponding output 634 (also referred to herein as "profile residuals"). The corresponding output 634 may indicate changes to be made to value(s) of attribute(s) of the candidate profile 510 to obtain counterfactual candidate profile 620.

In some embodiments, counterfactual candidate profile 620 may be generated at least in part by applying the trained generator neural network model 632 to the input candidate profile 510 to obtain the corresponding output 634. In some embodiments, the corresponding output 634 may be combined with the input candidate profile 510 to obtain the counterfactual candidate profile 620.

In some embodiments, the trained machine learning model 612 may be applied to the counterfactual candidate profile 620 to generate a second outcome. When the second outcome has a value in the set of one or more target values (e.g., second outcome has the value "1"), a target or desired output may be obtained indicating that the candidate is permitted to join the hiring marketplace system 420.

In some embodiments, when the second outcome does not have a value in the set of one or more target values, the input candidate profile 510 may be processed by the trained generator neural network model 632 in an iterative manner to generate additional corresponding outputs and counterfactual candidate profiles until processing of a particular counterfactual candidate profile by the trained machine learning model 612 results in the target output being obtained. For example, a first counterfactual candidate profile may be generated during a first iteration by combining a first corresponding output with the input candidate profile, where the first corresponding output indicates a first set of changes to be made to a first set of values of a first set of attributes of the input candidate profile, a second counterfactual candidate profile may be generated during a second iteration by combining a second corresponding output with the input candidate profile, where the second corresponding output indicates a second set of changes to be made to a second set of values of a second set of attributes of the input candidate profile, and so on. In some embodiments, the first set of changes may be different than the second set of changes. In other embodiments, the first set of changes and the second set of changes may have at least one (but not all) change in common.

In some embodiments, counterfactual candidate profile 620 may be generated at least in part by applying the trained generator neural network model 632 to the input candidate profile 510 and values of one or more attributes associated with the hiring marketplace system 420 to obtain the corresponding output 634. Examples of hiring marketplace attributes 615 may include number of open positions, a number of recruiters looking for candidates, a number of candidates looking at the same job, and other hiring marketplace attributes. Table 3 below shows various examples of candidate profile attributes and hiring marketplace attributes.

Examples of Candidate Profile Attributes and Hiring Marketplace Attributes

TABLE 3

| Attribute Name | Description |
| --- | --- |
| candidate_junior_yoe | If the candidate has 0-2 YoE (years of experience) for their primary role choice. |
| candidate_n_reportees | How many repartees did the candidate say they have. |
| candidate_hidden_from_discovery_ever | Was the candidate ever previously hidden from discovery |
| candidate_subprime_job_title_score | If the candidate has a subprime job title in their work history, for example bartender. |
| candidate_senior_yoe | If the candidate has 15+ YoE for their primary role choice. |
| candidate_from_consulting_currently | If the candidate is a consultant. |
| candidate_bootcamp_education | If the candidate has had a bootcamp education. |
| candidate_phd_education | If the candidate has had a phd education. |
| candidate_masters_education | If the candidate has had a masters education. |
| candidate_prefers_secondary_markets | If the candidate prefers markets considered to be secondary markets. |
| candidate_origin_market_in_preferred | If the candidate's origin market in in their preferred markets. |
| candidate_from_known_university | If the candidate attended a university which past clients on the hiring marketplace system have shown an affinity towards. |
| candidate_legacy_experience_spaces_count_mean | The average word count of a candidate's work experience section. |
| candidate_prefers_core_markets | If the candidate prefers markets considered core markets. |
| candidate_bachelor_education | If the candidate has had a bachelor education. |
| candidate_verified_yoe_from_resume | Corroborates YoE from a candidate's resume with their candidate profile |
| candidate_stem_education | If the candidate has received a degree in a STEM (Science, Tech, Enq, Math) field. |
| candidate_prestigious_education_legacy | If a candidate has attended an educational institution based on a top 100 list. |
| candidate_cv_not_sparse | If the candidate has included either a resume or LinkedIn link. |
| candidate_verified_skill_number_from_resume | Corroborates number of skills from a candidate's resume with their candidate profile |
| candidate_sum_role_max_skill_score | The sum (over all subroles) of max (across all candidate's skills) skill-popularity score. Here "skill-popularity score" describes the probability of a skill required by jobs per role. |
| candidate_num_active_jobs_primary_role | Number of active jobs on hiring marketplace system (i.e. demand). |
| candidate_verified_skill_number_from_resume_by_exp | Corroborates number of skills from a candidate's resume (work description section) with their candidate profile |
| candidate_n_additional_skills | How many skills over 5 a candidate has inputted. |
| candidate_num_competitors_primary_role | Number of active candidates on the hiring marketplace system (i.e. supply) for a given role and market. |

TABLE 3-continued

| Attribute Name | Description |
|---|---|
| candidate_legacy_headline_spaces_count | Number of words in a candidate's headline. |
| candidate_employment_history_count | How many previous work experiences has the candidate had. |
| candidate_sum_role_sum_skill_score | The sum (over all subroles) of sum (over all candidate's skills) of "skill-popularity score". |
| candidate_max_role_max_skill_score | The max (across all subroles) of max (across all candidate's skills) "skill-popularity score". |
| candidate_primary_role_yoe_mean | Primary role YoE as inputted by the candidate. |
| candidate_per_at_top_fifteen | How many times has a candidate, which has previously been on the hiring marketplace, been ranked in the top 15 of results when an employer has viewed their profile. |
| candidate_from_known_company | If the candidate has worked at a company which past clients on the hiring marketplace have shown an affinity towards. |
| candidate_per_at_top_one | How many times has a candidate, which has previously been on the hiring marketplace, been ranked in the top 1 of results when an employer has viewed their profile. |
| candidate_per_at_top_five | How many times has a candidate, which has previously been on the hiring marketplace, been ranked in the top 5 of results when an employer has viewed their profile. |
| candidate_max_role_sum_skill_score | The max (across all subroles) of sum (over all candidate's skills) of "skill-popularity score". |
| candidate_salary_in_range_score | Value based on how closely the candidate's preferred salary aligns with typical salaries for a given role and market. |
| candidate_yoe_subrole | Max score of corroborating candidate's claimed subrole YoEs with the work experience titles and time durations over all subroles (upto 3) claimed in candidate profiles. |
| candidate_num_times_live | Number of times a candidate has previously been live on the hiring marketplace |
| candidate_preferred_salary | A candidate's preferred salary |
| candidate_avg_percent_subrole_validation | Harmonic mean of all scores in terms of corroborating candidate's claimed subrole names with the work experience titles and time durations. |
| candidate_percent_subrole | Max score of corroborating candidate's claimed subrole names with the work experience titles and time durations over all subroles (upto 3) claimed in candidate profiles. |
| candidate_has_intros | If a candidate has previously had Intros on the hiring marketplace. |
| candidate_has_3_intros | If a candidate has previously had 3 or more Intros on the hiring marketplace. |
| candidate_prime_job_title_score | If the candidate has a prime job title in their work history, for example principal software engineer. |
| candidate_avg_subrole_yoe | Geometric mean of all scores in terms of corroborating candidate's claimed subrole names with the work experience titles and time durations over all subroles (upto 3) claimed in candidate profile. |
| candidate_avg_subrole_validation_product | "avg_subrole_yoe" feature multiply "avg_percent_subrole_validation" feature. |

Table 4 below shows examples of values for candidate profile attributes (associated with the candidate profile, for example) and hiring marketplace attributes that may be provided as input to the trained generator neural network model 632. In some embodiments, values of some attributes may be processed prior to being provided as input to the trained generator neural network model. For example, some values in a Boolean format in Table 4 may be converted to a floating number format (False→0, True→1).

Examples of Candidate Profile Attributes and Hiring Marketplace Attributes Provided as Input a Trained Generator Neural Network Model

TABLE 4

| Attribute name | Sample 1 | Sample 2 | Sample 3 | Sample 4 | Sample 5 |
|---|---|---|---|---|---|
| candidate_senior_yoe | FALSE | FALSE | TRUE | FALSE | TRUE |
| candidate_salary_in_range_score | 0.6177486227 | 0 | 0.6894521638 | 0.2366782369 | 0.2780871934 |
| label | 0 | 0 | 0 | 0 | 0 |
| candidate_avg_percent_subrole_validation | 0.0473484848 | 0.2777777778 | 0.9591836735 | 0.83 | 1 |
| candidate_native_secondary_market | TRUE | TRUE | FALSE | FALSE | FALSE |
| candidate_max_role_max_skill_score | 0.417383821 | 0.175448126 | 0.2234533703 | 0.4308779011 | 0.1915285451 |
| candidate_junior_yoe | TRUE | TRUE | FALSE | FALSE | FALSE |
| candidate_per_at_top_five | 0 | 0 | 0 | 0.2666666667 | |

In some embodiments, the input candidate profile 510 may include a number of mutable attributes and at least one immutable attribute. Mutable attributes refer to attributes whose values may be changed as part of the counterfactual generation process. Immutable attributes refer to attributes whose values may not be changed as part of the counterfactual generation process. Examples of mutable attributes may include a candidate's expected salary and headline whereas examples of immutable attributes may include the candidate's years of experience and education degrees. In some embodiments, the trained generator neural network model 632 may be applied to the input candidate profile 510 to obtain the corresponding output 634 that indicates changes only to attribute values of at least some of the mutable attributes of the input candidate profile 510. In other words, the corresponding output 634 may not indicate changes to immutable attributes of the input candidate profile 510. In some embodiments, values of immutable attributes may be set to "0" in the corresponding output 634 such that the counterfactual candidate profile 620 includes the same values for the immutable attributes as the input candidate profile 510.

With reference to Tables 3 and 4 above, some of the candidate profile attributes may be mutable and others may be immutable. On the other hand, all hiring marketplace attributes may be immutable.

In some embodiments, the trained generator neural network model 632 may be trained using a discriminator neural network model 640 trained to distinguish real data from synthetic data generated by the generator neural network model 632. During training, the generator neural network model 632 and the discriminator neural network model 640 may be trained using an adversarial training approach. The generator neural network model 632 may be trained to generate synthetic data that confuses the discriminator neural network model 640. The discriminator neural network model 640 may be provided real data and the synthetic data generated by the generator neural network model 632 and may be trained to distinguish real data from the synthetic data. In some embodiments, the generator neural network model may be trained a greater number of times than the discriminator neural network model (e.g., two more times, three more times, etc.).

The RGAN model of FIG. 6B may be used to generate counterfactual candidate profiles specific to a fixed and previously trained machine learning model 612. For example, the trained machine learning model 612 may be a trained machine learning classifier. The formulation of the value function for the RGAN model that relies on a trained generator neural network model G, a trained discriminator neural network model D, and a fixed classifier C (for a target class t) is defined in equation (6):

$$V_{counterRAN}(G,D,C,t) = E_{x \sim \rho_{data}}[\log D(x) + \log(1 - D(x + G(x))) + \log(1 - C_t(x + G(x)))] \quad (6)$$

Where both the generator neural network model and the discriminator neural network model use input samples from the same probability distribution $\rho_{data}$. A regularization term $\lambda E_{x \sim \rho_{data}} \|G(x)\|_2^2$ may be added to control proximity.

In some embodiments, the classifier may be trained to determine, based on an input candidate profile, whether a candidate is permitted to join the hiring marketplace system 420. Candidate profiles from historical marketplace data may be used as samples of $\rho_{data}$. During training, real candidate profiles may be provided to the generator neural network model as input. The generator neural network may be trained iteratively via gradient descent to minimize the value function in equation (6) and generate counterfactual candidate profiles that achieve high classifier scores while also appearing realistic to the discriminator neural network model. The discriminator neural network model may be trained to maximize the value function and hence distinguish real candidate profiles from those synthesized by the generator neural network model.

In some embodiments, the trained machine learning model may comprise a gradient boosted decision trees model, such as, an XGBoost model. In other embodiments, the trained machine learning model may comprise a trained neural network model. The trained neural network model may include a fully connected neural network. The trained neural network model may include at least 10,000 parameters, at least 25,000 parameters, at least 50,000 parameters, at least 100,000 parameters, at least 500,000 parameters, at least 1,000,000 parameters, between 10,000 and 100,000 parameters, between 50,000 and 150,000 parameters, between 50,000 and 500,000 parameters, or any other suitable range within these ranges.

In some embodiments, the trained generator neural network model may include a fully connected neural network. The trained generator neural network model may include a plurality of layers and training the generator neural network model may include modifying parameters associated with the layers of the neural network. The trained generator neural network model may include at least 10,000 parameters, at least 25,000 parameters, at least 50,000 parameters, at least 100,000 parameters, at least 500,000 parameters, at least 1,000,000 parameters, between 10,000 and 100,000 parameters, between 50,000 and 150,000 parameters, between 50,000 and 500,000 parameters, or any other suitable range within these ranges.

In some embodiments, the trained discriminator neural network model may include a fully connected neural network. The trained discriminator neural network model may include a plurality of layers and training the discriminator neural network model may include modifying parameters associated with the layers of the neural network. The discriminator neural network model may output a single value indicating whether its input is realistic or not. In some embodiments, the discriminator neural network model may include labels where real samples are labeled as "1" and synthetic or fake samples are labeled as "0". In some embodiments, the trained discriminator neural network model may include at least 10,000 parameters, at least 25,000 parameters, at least 50,000 parameters, at least 100,000 parameters, at least 500,000 parameters, at least 1,000,000 parameters, between 10,000 and 100,000 parameters, between 50,000 and 150,000 parameters, between 50,000 and 500,000 parameters, or any other suitable range within these ranges.

The performance of the RGAN model relative to other conventional counterfactual generation techniques (RGD and CSGP) is shown below in Table 5. The arrows indicate whether larger ↑ or lower ↓ values are better, and the best results are in bold. As can be seen, the RGAN model outperforms other conventional methods in terms of latency needed for real-time production systems. Details of applying the RGAN model on historical test data consisting of candidate profile samples is described in article titled "Providing Actionable Feedback in Hiring Marketplaces Using Generative Adversarial Networks," which is hereby incorporated by reference in its entirety.

Example Performance Results of RGAN Model
Relative to Other Conventional Counterfactual
Generation Techniques

TABLE 5

| Metric | Formula | RGD | CSGP | CounteRGAN |
|---|---|---|---|---|
| ↑Realism | $\|AE(x_{cf}) - x_{cf}\|_2^2$ | 1.08 ± 0.02 | 0.69 ± 0.02 | 0.68 ± 0.02 |
| ↓Prediction gain | $C(x_{cf}) - C(x)$ | 0.42 ± 0.02 | 0.07 ± 0.01 | 0.08 ± 0.01 |
| ↓Actionability | $\|x_{cf} - x\|_1$ | 1.31 ± 0.03 | 0.16 ± 0.02 | 0.45 ± 0.02 |
| ↓Latency (ms) | — | 1,696.65 ± 2.54 | 7,713.98 ± 2.54 | 1.57 ± 0.02 |
| ↓Batch latency (s) | — | 1,028.17 | 4,674.67 | 0.03 |

Where $x_{cf}$ is the suggested counterfactual and x is the input data sample for which a counterfactual is sought. Prediction gain measures the difference between the classifier's prediction on the counterfactual and the input data sample. Realism is based on the reconstruction error of generated counterfactuals using a denoising autoencoder. Actionability uses the L1 distance between the generated counterfactual and the input data sample. Latency is the total execution time needed to compute one counterfactual and batch latency is based on computing counterfactuals across the entire test dataset.

Examples of real-time actionable feedback provided by the RGD and CSGP techniques and the RGAN model for two real candidate profiles are shown in Table 6 below. The last row shows the classifier score for the initial candidate profile, and for the same profile after applying the feedback generated based on the counterfactual. As can be seen, the RGAN model is able to achieve realistic and actionable feedback capable of improving the classifier score over the 0.5 approval decision threshold.

Examples of Feedback Provided by the RGAN
Model Relative to Other Conventional
Counterfactual Generation Techniques

TABLE 6

| | First example | | | | Second example | | | |
|---|---|---|---|---|---|---|---|---|
| Feature | Init. values | RGD | CSGP | CounteRGAN | Init. values | RGD | CSGP | CounteRGAN |
| Expected salary | 165,000 | +185,000 | +5,000 | +15,000 | 180,000 | +5,000 | 0 | +60,000 |
| Candidate headline word count | 4 | +7 | 0 | +5 | 4 | +1 | 0 | +8 |
| Experience relevance score | 0.72 | +0.22 | +0.06 | +0.46 | 0.53 | +2.47 | +0.06 | +0.22 |
| Work experience avg word count | 77.00 | −18.42 | 0.00 | +19.13 | 31.00 | −5.81 | 0.00 | +5.64 |
| Verified years of experience | 10.83 | −0.26 | 0.00 | −4.71 | 18.83 | −0.01 | 0.00 | +1.09 |
| Skills popularity score | 0.63 | +2.67 | +0.39 | +0.76 | 0.94 | +2.25 | +0.07 | −0.11 |
| Classifier prediction scores | 0.35 | 0.97 | 0.50 | 0.73 | 0.45 | 0.97 | 0.51 | 0.62 |

The first column of Table 6 shows six attributes (expected salary, candidate headline word count, experience relevance score, work experience average word count, verified years of experience, skills popularity score) of candidate profiles which are considered for the counterfactual generation process. In some embodiments, some or all of these attributes may be mutable. The second column shows initial values of the six attributes of a first input candidate profile and the sixth column shows initial values of the six attributes of a second input candidate profile. In both these cases, all the techniques (RGD, CSGP, and RGAN) were able to suggest feedback that results in the classifier permitting the candidates to join the hiring marketplace system (e.g., assuming a decision threshold of 0.5). For the first candidate profile (i.e., first example in Table 6), the RGD technique suggests more than doubling the expected salary, which is not a realistic change. The CSGP technique suggests minimal changes that increase the classifier score by 0.15, and the RGAN suggests slightly larger updates to the attribute values but achieves a larger prediction gain of 0.47. A similar pattern is observed for the second candidate profile (i.e., second example in Table 6). The feedback provided by the RGAN model is not only actionable and of significant utility to the candidate but is also able to be provided in real-time (e.g., over 1000-30,000 times faster than the other conventional approaches) once the candidate submits their profile for admission to the hiring marketplace system.

Figure 7:
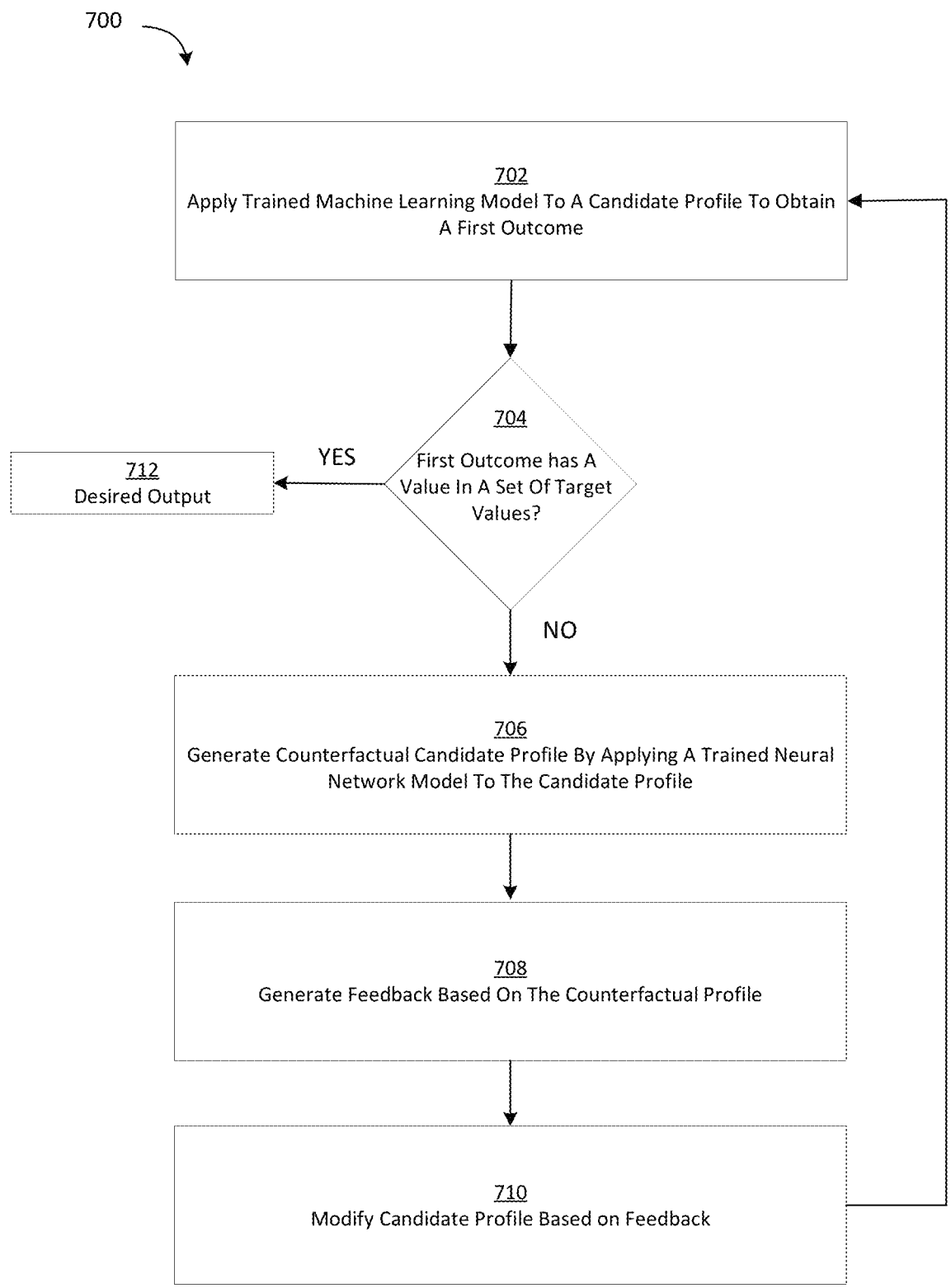
FIG. 7 is a diagram of a process of generating a counterfactual candidate profile by applying a trained neural network model to an input candidate profile, in accordance with some embodiments of the technology described herein.

FIG. 7 is a diagram of a process of generating a counterfactual candidate profile by applying a trained neural network model to an input candidate profile, in accordance with some embodiments of the technology described herein. Process 700 may be executed by any suitable computing device associated with the hiring marketplace system 420 described herein. Process 700 begins at act 702, where a trained machine learning model (e.g., trained machine learning model 612) may be applied to an input (e.g., input candidate profile 510) to obtain a first outcome. At act 704, a determination may be made regarding whether the first outcome has a value in a set of target values. When it is determined that the first outcome has a value in the set of target values, a determination made be made that a target or desired output has been obtained in act 712. When it is determined that the first outcome does not have a value in the set of target values, process 700 may proceed to act 706.

In act 706, a counterfactual candidate profile (e.g., counterfactual candidate profile 620) may be generated at least in part by applying a trained neural network model (e.g., trained generator neural network model 632) to the input to obtain a corresponding output (e.g., corresponding output 634). The corresponding output may indicate changes to be made to one or more values of one or more attributes of the input candidate profile to obtain the counterfactual candidate profile. In some embodiments, the counterfactual candidate profile may be generated by combining the input candidate profile (e.g., values of attributes of the input candidate profile) and the corresponding output. In some embodiments, the counterfactual candidate profile may incorporate the changes indicated by the corresponding output.

In some embodiments, the trained machine learning model 612 may be applied to the counterfactual candidate profile to obtain a second outcome. When it is determined that the second outcome has a value in the set of target values, a determination may be made that making the changes indicated in the corresponding output will result in a target or desired output being obtained and the process 700 proceeds to acts 708 and 710. In some embodiments, when it is determined that the second outcome does not have a value in the set of target values, the process 700 may generate an additional counterfactual candidate profile by applying the trained neural network model to the input candidate profile to obtain an additional corresponding output. The trained machine learning model may be applied to the additional counterfactual candidate profile to obtain a third outcome. When it is determined that the third outcome has a value in the set of target values, a determination may be made that making the changes indicated in the additional corresponding output will result in a target or desired output being obtained and the process 700 may proceed to acts 708 and 710. In some embodiments, when it is determined that the third outcome does not have a value in the set of target values, the process 700 may generate yet another counterfactual candidate profile by applying the trained neural network model to the input candidate profile to obtain another corresponding output. This process may go on until a counterfactual candidate profile is generated that when processed by the trained machine learning model results in the target or desired output being obtained.

In act 708, feedback may be generated based on the counterfactual candidate profile. In some embodiments, generating the feedback may include generating a recommendation that a user consider making one or more of the changes indicated in the corresponding output of the trained neural network model. In some embodiments, generating the feedback may include generating an explanation indicating an impact of making the one or more of the changes indicated in the corresponding output. For example, a recommendation may be generated for a candidate indicating that the candidate consider making a change to the value of the expected salary attribute (e.g., add $15,000 to the expected salary). Alternatively or additionally, an explanation may be provided indicating that increasing the expected salary may result in a target or desired output (e.g., candidate being permitted to join the hiring marketplace system) to be obtained.

In act 710, the input may be modified based on the feedback. In some embodiments, one or more values of one or more attributes of the input may be modified based on the feedback. In some implementations, a recommendation may be presented to a user using a web-based user interface. The user may be prompted to accept or reject the recommendation. In response to the user accepting the recommendation, the input may be modified to incorporate the recommended change(s). For example, the expected salary value of the input candidate profile may be modified based on a recommendation that the candidate consider making such a change.

In some embodiments, once the candidate is permitted to join the hiring marketplace system 420, the RGAN model may be utilized to rank the candidate relative to other candidates participating in the hiring marketplace. In some embodiments, the trained machine learning model may include a trained machine learning classifier configured to generate output used for ranking the candidate relative to one or more other candidates participating in the hiring marketplace. In these embodiments, the trained machine learning classifier may be applied to an input candidate profile, such as, candidate profile 510, to obtain a first outcome indicative of a rank for the candidate.

In some embodiments, a determination may be made whether the first outcome has a value in a set of one or more target values (e.g., a set including ranks 1-5 for top 5 candidates). When it is determined that the first outcome has a value in the set of one or more target values (e.g., the first outcome has a value "2" that is in the set), a determination may be made that a target outcome is obtained. When it is determined that first outcome does not have a value in the set of one or more target values (e.g., the first outcome has a value "10" that is not in the set), a determination may be made that a target outcome is not obtained, and the candidate's rank can be improved.

In some embodiments, applying the trained machine learning model to the input candidate profile may include generating a first input using the candidate profile (e.g., values associated with attributes of the candidate profile); providing the first input as input to the trained machine learning model; and generating a first output from the trained machine learning model. In some embodiments, the first outcome may be determined from the first output. For example, the first outcome (e.g., the candidate's rank) may be determined from a score for the input candidate profile output by the trained machine learning model.

In some embodiments, the trained machine learning model may include a gradient boosted decision trees model, such as, an XGBoost model. The trained machine learning model accepts as input the input candidate profile, values of attributes associated with a query to rank candidates, and values of attributes associated with hiring marketplace system (e.g., attributes associated with an employer searching for candidates for a job posting). The trained neural network model may include at least 10,000 parameters, at least 25,000 parameters, at least 50,000 parameters, at least 100,000 parameters, at least 500,000 parameters, at least 1,000,000 parameters, between 10,000 and 100,000 parameters, between 50,000 and 150,000 parameters, between 50,000 and 500,000 parameters, or any other suitable range within these ranges.

In some embodiments, when it is determined that first outcome does not have a value in the set of one or more target values, a counterfactual candidate profile (e.g., counterfactual candidate profile 620) may be generated at least in part by applying a trained neural network model (e.g., trained generator neural network model 632) to the input candidate profile 510 to obtain a corresponding output (e.g., corresponding output 634) as explained above in relation to FIGS. 6B and 7.

In some embodiments, the set of one or more target values may be a discrete set of values and a determination may be made regarding whether the first outcome has a value in the discrete set of values. In other embodiments, the set of one or more target values may a continuous set of values.

Figure 8:
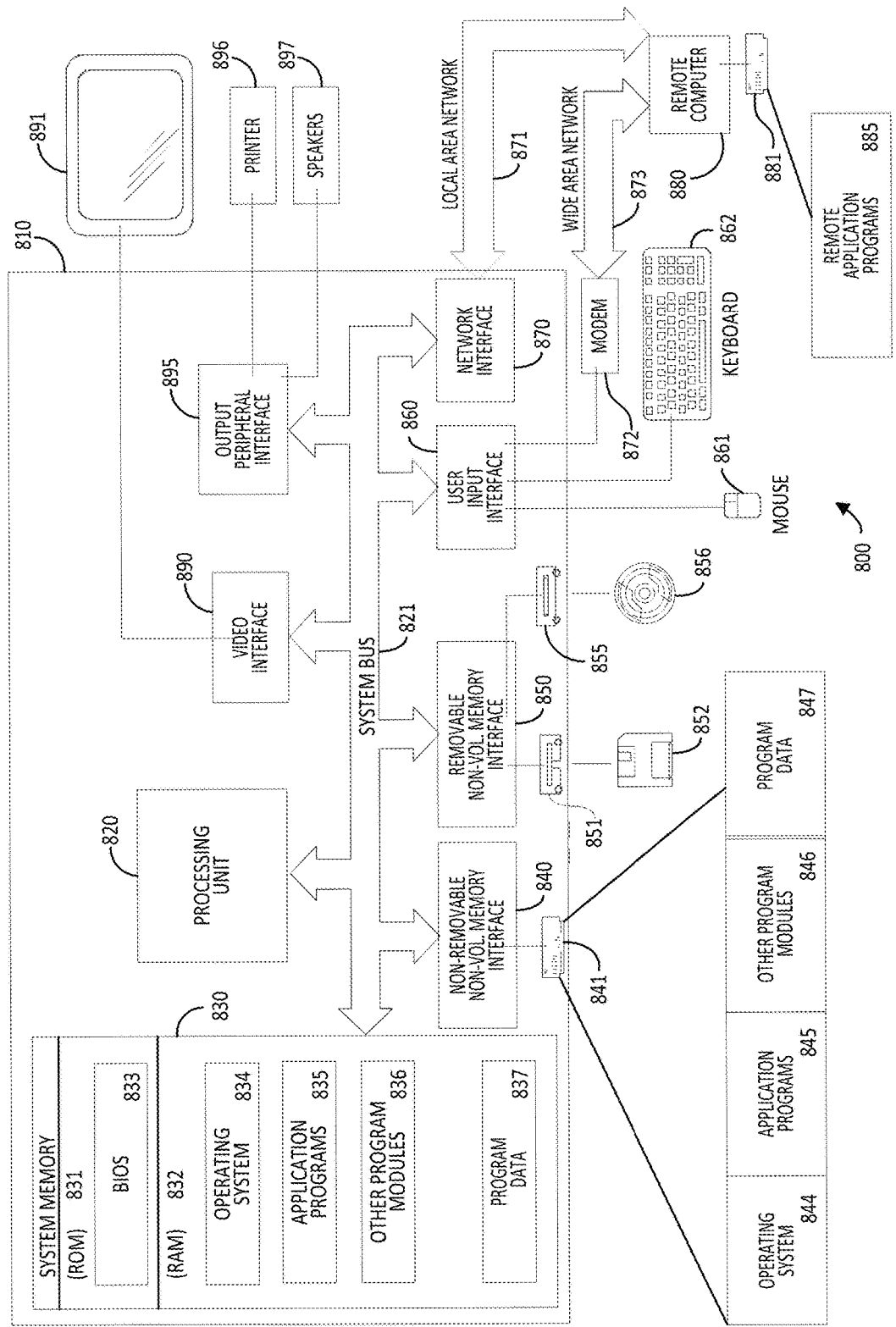
FIG. 8 is a diagram of an illustrative computer system on which embodiments described herein may be implemented.

FIG. 8 illustrates an example of a suitable computing system environment 800 on which the technology described herein may be implemented. The computing system environment 800 is only one example of a suitable computing environment and is not intended to suggest any limitation as to the scope of use or functionality of the technology described herein. Neither should the computing environment 800 be interpreted as having any dependency or requirement relating to any one or combination of components illustrated in the exemplary operating environment 800.

The technology described herein is operational with numerous other general purpose or special purpose computing system environments or configurations. Examples of well-known computing systems, environments, and/or configurations that may be suitable for use with the technology described herein include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The computing environment may execute computer-executable instructions, such as program modules. Generally, program modules include routines, programs, objects, components, data structures, etc. that perform particular tasks or implement particular abstract data types. The technology described herein may also be practiced in distributed computing environments where tasks are performed by remote processing devices that are linked through a communications network. In a distributed computing environment, program modules may be located in both local and remote computer storage media including memory storage devices.

With reference to FIG. 8, an exemplary system for implementing the technology described herein includes a general purpose computing device in the form of a computer 800. Components of computer 810 may include, but are not limited to, a processing unit 820, a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 810. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 8 illustrates operating system 834, application programs 835, other program modules 836, and program data 837.

The computer 810 may also include other removable/non-removable, volatile/nonvolatile computer storage media. By way of example only, FIG. 8 illustrates a hard disk drive 841 that reads from or writes to non-removable, nonvolatile magnetic media, a flash drive 851 that reads from or writes to a removable, nonvolatile memory 852 such as flash memory, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

The drives and their associated computer storage media described above and illustrated in FIG. 8, provide storage of computer readable instructions, data structures, program modules and other data for the computer 810. In FIG. 8, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies. An actor may enter commands and information into the computer 810 through input devices such as a keyboard 862 and pointing device 861, commonly referred to as a mouse, trackball or touch pad. Other input devices (not shown) may include a microphone, joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A monitor 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 may operate in a networked environment using logical connections to one or more remote computers, such as a remote computer 880. The remote computer 880 may be a personal computer, a server, a router, a network PC, a peer device or other common network node, and typically includes many or all of the elements described above relative to the computer 810, although only a memory storage device 881 has been illustrated in FIG. 8. The logical connections depicted in FIG. 8 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the actor input interface 860, or other appropriate mechanism. In a networked environment, program modules depicted relative to the computer 810, or portions thereof, may be stored in the remote memory storage device. By way of example, and not limitation, FIG. 8 illustrates remote application programs 885 as residing on memory device 881. It will be appreciated that the network connections shown are exemplary and other means of establishing a communications link between the computers may be used.

Having thus described several aspects of at least one embodiment of the technology described herein, it is to be appreciated that various alterations, modifications, and improvements will readily occur to those skilled in the art.

Such alterations, modifications, and improvements are intended to be part of this disclosure, and are intended to be within the spirit and scope of disclosure. Further, though advantages of the technology described herein are indicated, it should be appreciated that not every embodiment of the technology described herein will include every described advantage. Some embodiments may not implement any features described as advantageous herein and in some instances one or more of the described features may be implemented to achieve further embodiments. Accordingly, the foregoing description and drawings are by way of example only.

The above-described embodiments of the technology described herein can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semicustom or custom. As a specific example, some commercially available microprocessors have multiple cores such that one or a subset of those cores may constitute a processor. However, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, aspects of the technology described herein may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments described above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the technology as described above. As used herein, the term "computer-readable storage medium" encompasses only a non-transitory computer-readable medium that can be considered to be a manufacture (i.e., article of manufacture) or a machine. Alternatively or additionally, aspects of the technology described herein may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the technology as described above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the technology described herein.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the technology described herein may be used alone, in combination, or in a variety of arrangements not specifically described in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the technology described herein may be embodied as a method, of which examples are provided herein including with reference to FIGS. 2 and 7. The acts performed as part of any of the methods may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method, comprising:
using at least one computer hardware processor to perform:
receiving an input candidate profile associated with a candidate requesting to join a hiring marketplace system;
applying a trained machine learning model to the input candidate profile to obtain a first outcome, the first outcome indicating whether the candidate is permitted to join the hiring marketplace system based on the input candidate profile;
determining whether the first outcome has a value in a set of one or more target values;
when it is determined that the first outcome does not have a value in the set of one or more target values, generating a counterfactual candidate profile at least in part by using a residual generative adversarial network model including a generator neural network model, the generator neural network model trained using a discriminator neural network model, wherein generating the counterfactual candidate profile comprises:
applying the generator neural network model to the input candidate profile to obtain a corresponding output, wherein:
the corresponding output indicates changes to be made to one or more values of one or more attributes of the input candidate profile to obtain the counterfactual candidate profile, and
applying the trained machine learning model to the counterfactual candidate profile produces a second outcome having a value in the set of one or more target values, the second outcome indicating that the candidate is permitted to join the hiring marketplace system;
generating feedback based on the counterfactual candidate profile, wherein generating the feedback comprises generating a recommendation that the candidate consider making at least one of the changes indicated in the corresponding output of the generator neural network model;
after providing the recommendation to the candidate, receiving an updated candidate profile including at least one of the changes indicated in the corresponding output of the generator neural network model;
determining whether the candidate is permitted to join the hiring marketplace system at least in part by applying the trained machine learning model to the updated candidate profile; and
permitting the candidate to join the hiring marketplace system in response to determining that the candidate is permitted to join the hiring marketplace system.

2. The method of claim 1, wherein generating the counterfactual candidate profile further comprises:
combining the corresponding output with the input candidate profile to obtain the counterfactual candidate profile.

3. The method of claim 1, wherein the set of one or more target values is a discrete set of values, and wherein determining whether the first outcome has a value in the set of one or more target values comprises determining whether the first outcome has a value in the discrete set of values.

4. The method of claim 1, wherein the set of one or more target values comprises a single value, and wherein determining whether the first outcome has a value in the set of one or more target values comprises determining whether the first outcome has the single value.

5. The method of claim 1, wherein the set of one or more target values comprises a continuous set of values.

6. The method of claim 1, wherein the trained machine learning model comprises a trained machine learning classifier.

7. The method of claim 1, wherein the generator neural network model was trained using the discriminator neural network model trained to distinguish real input from synthetic input generated by the generator neural network model.

8. The method of claim 7, wherein the generator neural network model and the discriminator neural network model were trained using an adversarial training approach.

9. The method of claim 1, wherein the generator neural network model is a fully connected neural network.

10. The method of claim 1, wherein the residual generative adversarial network model is trained using a regularization term to control proximity of an output data point relative to an input data point.

11. The method of claim 1, further comprising:
receiving user input indicating whether the candidate accepted or rejected the recommendation; and
wherein receiving the updated candidate profile comprises:
when the user input indicates that the candidate accepted the recommendation, updating the input candidate profile to obtain the updated candidate profile at least in part by incorporating the at least one of the changes indicated in the corresponding output of the generator neural network model into the input candidate profile.

12. The method of claim 1, further comprising:
generating an explanation indicating an impact of making at least one of the changes indicated in the corresponding output of the generator neural network model.

13. The method of claim 1, the generating the counterfactual candidate profile comprises:
generating the counterfactual candidate profile at least in part by applying the generator neural network model to the input candidate profile and values of one or more attributes associated with the hiring marketplace system to obtain the corresponding output.

14. The method of claim 13, wherein the trained machine learning model comprises a trained machine learning classifier configured to generate output used for ranking the candidate relative to one or more other candidates participating in the hiring marketplace system.

15. The method of claim 13, wherein the one or more attributes of the input candidate profile comprise a plurality of mutable attributes and at least one immutable attribute, and generating the counterfactual candidate profile further comprises:
setting to zero a portion of the corresponding output indicating at least one change to at least one value of the at least one immutable attribute such that the corresponding output indicates changes only to values of one or more of the plurality of mutable attributes.

16. The method of claim 15, wherein generating the counterfactual candidate profile further comprises:
applying one or more realism rules to generate the counterfactual candidate profile, the one or more realism rules indicating whether the values of one or more of the plurality of mutable attributes fall within a known data distribution.

17. The method of claim 15, wherein the generating the counterfactual input further comprises:
applying one or more actionability rules to generate the counterfactual candidate profile, the one or more actionability rules indicating a number and/or magnitude of allowed changes to the values of one or more of the plurality of mutable attributes.

18. The method of claim 1, wherein the trained machine learning model comprises a trained machine learning classifier configured to determine whether the candidate is permitted to join the hiring marketplace.

19. A system comprising:
at least one processor;
at least one non-transitory computer readable storage medium storing instructions that when executed by the at least one processor, cause the at least one processor to perform a method comprising:
receiving an input candidate profile associated with a candidate requesting to join a hiring marketplace system;
applying a trained machine learning model to the input candidate profile to obtain a first outcome, the first outcome indicating whether the candidate is permitted to join the hiring marketplace system based on the input candidate profile;
determining whether the first outcome has a value in a set of one or more target values;
when it is determined that the first outcome does not have a value in the set of one or more target values,
generating a counterfactual candidate profile at least in part by using a residual generative adversarial network model including a generator neural network model, the generator neural network model trained using a discriminator neural network model, wherein generating the counterfactual candidate profile comprises:
applying the generator neural network model to the input candidate profile to obtain a corresponding output, wherein:
the corresponding output indicates changes to be made to one or more values of one or more attributes of the input candidate profile to obtain the counterfactual candidate profile, and
applying the trained machine learning model to the counterfactual candidate profile produces a second outcome having a value in the set of one or more target values, the second outcome indicating that the candidate is permitted to join the hiring marketplace system;
generating feedback based on the counterfactual candidate profile, wherein generating the feedback comprises generating a recommendation that the candidate consider making at least one of the changes indicated in the corresponding output of the generator neural network model;
after providing the recommendation to the candidate, receiving an updated candidate profile including at least one of the changes indicated in the corresponding output of the generator neural network model;
determining whether the candidate is permitted to join the hiring marketplace system at least in part by applying the trained machine learning model to the updated candidate profile; and
permitting the candidate to join the hiring marketplace system in response to determining that the candidate is permitted to join the hiring marketplace system.

20. At least one non-transitory computer readable storage medium storing processor executable instructions that when executed by at least one processor, cause the at least one processor to perform a method comprising:
receiving an input candidate profile associated with a candidate requesting to join a hiring marketplace system;
applying a trained machine learning model to the input candidate profile to obtain a first outcome, the first outcome indicating whether the candidate is permitted to join the hiring marketplace system based on the input candidate profile;

determining whether the first outcome has a value in a set of one or more target values;

when it is determined that the first outcome does not have a value in the set of one or more target values, generating a counterfactual candidate profile at least in part by using a residual generative adversarial network model including a generator neural network model, the generator neural network model trained using a discriminator neural network model, wherein generating the counterfactual candidate profile comprises:

applying the generator neural network model to the input candidate profile to obtain a corresponding output, wherein:

the corresponding output indicates changes to be made to one or more values of one or more attributes of the input candidate profile to obtain the counterfactual candidate profile, and applying the trained machine learning model to the counterfactual candidate profile produces a second outcome having a value in the set of one or more target values, the second outcome indicating that the candidate is permitted to join the hiring marketplace system;

generating feedback based on the counterfactual candidate profile, wherein generating the feedback comprises generating a recommendation that the candidate consider making at least one of the changes indicated in the corresponding output of the generator neural network model;

after providing the recommendation to the candidate, receiving an updated candidate profile including at least one of the changes indicated in the corresponding output of the generator neural network model;

determining whether the candidate is permitted to join the hiring marketplace system at least in part by applying the trained machine learning model to the updated candidate profile; and permitting the candidate to join the hiring marketplace system in response to determining that the candidate is permitted to join the hiring marketplace system.

* * * * *

UNITED STATES PATENT AND TRADEMARK OFFICE
CERTIFICATE OF CORRECTION

PATENT NO. : 11,836,633 B2
APPLICATION NO. : 17/469339
DATED : December 5, 2023
INVENTOR(S) : Daniel Alexander Nemirovsky et al.

It is certified that error appears in the above-identified patent and that said Letters Patent is hereby corrected as shown below:

In the Claims

At Column 35, Claim 13, Line 30:
"The method of claim 1, the"
Should read:
--The method of claim 1, wherein the--

Signed and Sealed this
Thirtieth Day of January, 2024

Katherine Kelly Vidal
*Director of the United States Patent and Trademark Office*